(12) United States Patent
Sakata et al.

(10) Patent No.: US 6,498,478 B2
(45) Date of Patent: Dec. 24, 2002

(54) AZIMUTH MEASURING METHOD, AZIMUTH MEASURING APPARATUS, POSITION MEASURING METHOD, AND POSITION MEASURING APPARATUS

(75) Inventors: Fumio Sakata, Tokyo (JP); Nobuyoshi Yamazaki, Kodaira (JP); Shinichi Endo, Sayama (JP); Koji Watanabe, Musashino (JP)

(73) Assignees: Radic Co., Ltd., Tokyo (JP); Sakata Denki Co., Ltd., Tokyo (JP)

( * ) Notice: Subject to any disclaimer, the term of this patent is extended or adjusted under 35 U.S.C. 154(b) by 0 days.

(21) Appl. No.: 09/928,586

(22) Filed: Aug. 13, 2001

(65) Prior Publication Data

US 2002/0036496 A1 Mar. 28, 2002

(30) Foreign Application Priority Data

Aug. 14, 2000 (JP) ........................................ 2000-245761
Dec. 12, 2000 (JP) ........................................ 2000-378349
Jun. 26, 2001 (JP) ........................................ 2001-192938

(51) Int. Cl.[7] .............................. G01B 7/14; G01B 7/30
(52) U.S. Cl. .............................. 324/207.17; 324/207.13
(58) Field of Search ........................ 324/207.17, 207.11, 324/207.12, 207.13, 207.15, 207.26, 331; 342/448, 451

(56) References Cited

FOREIGN PATENT DOCUMENTS

JP   2000-146509   5/2000

*Primary Examiner*—Edward Lefkowitz
*Assistant Examiner*—Subhash Zaveri
(74) *Attorney, Agent, or Firm*—Collard & Roe, P.C.

(57) ABSTRACT

First to third exciting coils are arranged at a reference position. First to third detecting coils are arranged at a measuring subject position distant from the reference position. Voltages induced in the first to third detecting coils are measured when the first exciting coil is excited. Voltages induced in the first to third detecting coils are measured when the second exciting coil is excited. Voltages induced in the first to third detecting coils are measured when the third exciting coil is excited. An azimuth of the measuring subject position from the reference position based on a predetermined calculation by using all nine induced-voltages which are obtained by the first to third detecting coils.

19 Claims, 12 Drawing Sheets

AZIMUTH MEASURING METHOD, AZIMUTH MEASURING APPARATUS, POSITION MEASURING METHOD, AND POSITION MEASURING APPARATUS

BACKGROUND OF THE INVENTION

1. Field of the Invention

The present invention relates to an azimuth measuring method and an azimuth measuring apparatus which are used for measuring an azimuth of a measuring subject position from a reference position, and a position measuring method and a position measuring apparatus which are used for measuring a measuring subject position.

2. Description of the Related Art

There are examples of measuring methods for measuring slide of a slide of a slope of shoulder in a road and a hillside. In a first example, a wire is provided between a measuring subject position and a reference position, a tension meter is installed to the wire, and the occurrence of the slide of the slope is detected based on a tension of the wire. In a second example, a wire is provided between a measuring subject position and a reference position and a displacement measuring meter is installed to the wire, and the occurrence of the slide of the slope is detected based on a displacement of the wire.

According to the above-mentioned measuring methods, the measurement is performed in such a manner that a measuring system makes contact with a measuring subject. Therefore, when a distance between the measuring subject position and the reference position is increased, the wire is loosened, thus causing a measurement error. Consequently, the above measuring methods are limited to the measurement of a relatively short distance.

To overcome the above-mentioned problem, optical measuring methods are used. The optical measuring methods use optical measuring equipment such as an electro-optic distance meter, a transit, and the like. By using the optical measurement equipment, the reference position is predetermined and the measuring subject position is optically measured based on the reference position. Thus, the change in the azimuth of the measuring subject position from the reference position can be measured in a non-contact status between the measuring subject and the measuring system. Further, the distance between the measuring subject position and the reference position can be prolonged and the optical measuring methods are frequently used for the measurement of the displacement and the slide of the slope.

However, the above optical measuring equipment has a problem in that the measuring subject position cannot be directly detected and measured in underground and underwater and, therefore, the optical measuring methods cannot perform the measurement in underground and underwater.

SUMMARY OF THE INVENTION

Accordingly, it is an object of the present invention to provide a position measuring method and a position measuring apparatus in which an azimuth of a measuring subject position from a reference position can be measured even in underground and underwater.

It is another object of the present invention to provide an azimuth measuring method and an azimuth measuring apparatus in which coordinates of a measuring subject position can be measured.

It is further object of the present invention to provide a position measuring method and a position measuring apparatus in which when a measuring subject at a measuring subject position is moved at another position, the other position can be measured.

According to a first aspect of the present invention, in an azimuth measuring method, first to third exciting coils are arranged, at a reference position which is predetermined, so that central axes thereof match three perpendicular axes of a triaxial coordinate system. First to third detecting coils are arranged at a measuring subject position distant from the reference position so that central axes thereof match three perpendicular axes of a triaxial coordinate system. Voltages induced in the first to third detecting coils are sequentially measured when the first exciting coil is excited. Voltages induced in the first to third detecting coils are sequentially measured when the second exciting coil is excited. Voltages induced in the first to third detecting coils are sequentially measured when the third exciting coil is excited. An azimuth of the measuring subject position from the reference position is determined based on a predetermined calculation by using all nine induced-voltages which are obtained by the first to third detecting coils.

According to the first aspect of the present invention, an azimuth measuring apparatus comprises a signal generating circuit for outputting an AC signal, first to third exciting coils arranged, at a reference position which is predetermined, so that central axes thereof match three perpendicular axes of a triaxial coordinate system, a first switching circuit for sequentially exciting the first to third exciting coils in response to outputs of the signal generating circuit, first to third detecting coils arranged at a measuring subject position distant from the reference position so that central axes thereof match three perpendicular axes of a triaxial coordinate system, a second switching circuit for sequentially extracting outputs of the first to third exciting coils, and a voltage extracting circuit for obtaining a voltage signal from the outputs extracted by the second switching circuit. In the azimuth measuring apparatus, first, voltages induced in the first to third detecting coils are sequentially extracted when the first exciting coil is excited. Next, voltages induced in the first to third detecting coils are sequentially extracted when the second exciting coil is excited. Further, voltages induced in the first to third detecting coils are sequentially extracted when the third exciting coil is excited. An azimuth of the measuring subject position from the reference position is determined based on a predetermined calculation by using all nine induced-voltages which are obtained by the first to third detecting coils.

According to a second aspect of the present invention, an azimuth measuring apparatus comprises first to third exciting coils arranged at a reference position which is predetermined, for generating magnetic fields perpendicular to each other, a signal generating circuit for sequentially supplying AC signals to the first to third exciting coils and exciting them, first to third detecting coils arranged, at a measuring subject position distant from the reference position, so that central axes thereof match three perpendicular axes of a triaxial coordinate system, an output switching circuit for sequentially extracting outputs of the first to third detecting coils, and a voltage extracting circuit for obtaining a voltage signal from outputs extracted by the output switching circuit. In the azimuth measuring apparatus, first, voltages induced in the first to third detecting coils are sequentially extracted when the first exciting coil is excited. Next, voltages induced in the first to third detecting coils are sequentially extracted when the second exciting coil is excited. Further, voltages induced in the first to third detecting coils are sequentially extracted when the third exciting coil is excited. An azimuth of the measuring subject position from the reference position is determined based on a predetermined calculation by using all nine induced-voltages which are obtained by the first to third detecting coils. In addition, in the azimuth measuring apparatus, an output from one of the first to third exciting coils is set as a reference output of the one exciting coil. In order to generate perpendicular AC magnetic fields, when exciting one of the two remaining exciting coils excluding the one exciting coil, the signal generating circuit applies a compensating voltage to the one exciting coil and the other remaining exciting coil of the two remaining exciting coils excluding the one exciting coil so that a magnetic field output of the one of the two remaining exciting coils is perpendicular to that of the one exciting coil. When exciting the other remaining exciting coil of the two remaining exciting coils excluding the one exciting coil, the signal generating circuit applies a compensating voltage to the one exciting coil and the one of the two remaining exciting coils excluding the one exciting coil so that a magnetic field output of the other remaining exciting coil is perpendicular to magnetic field outputs of the one exciting coil and the one of the two remaining exciting coil.

According to a third aspect of the present invention, an azimuth measuring apparatus comprises first to third exciting coils arranged at a reference position which is predetermined, for generating magnetic fields perpendicular to each other, a signal generating circuit for sequentially supplying AC signals to the first to third exciting coils and exciting them, first to third detecting coils arranged, at a measuring subject position distant from the reference position, so that central axes thereof match three perpendicular axes of a triaxial coordinate system, an output switching circuit for sequentially extracting outputs of the first to third detecting coils, and a voltage extracting circuit for obtaining a voltage signal from outputs extracted by the output switching circuit. In the azimuth measuring apparatus, first, voltages induced in the first to third detecting coils are sequentially extracted when the first exciting coil is excited. Next, voltages induced in the first to third detecting coils are sequentially extracted when the second exciting coil is excited. Further, voltages induced in the first to third detecting coils are sequentially extracted when the third exciting coil is excited. An azimuth of the measuring subject position from the reference position is determined based on a predetermined calculation by using all nine induced-voltages which are obtained by the first to third detecting coils. The azimuth measuring apparatus further comprises first to third compensating coils which are wound to the central axes of the first to third exciting coils, respectively. An output from one of the first to third exciting coils is set as a reference output of the one exciting coil. In order to generate perpendicular AC magnetic fields, when exciting one of the two remaining exciting coils excluding the one exciting coil, the signal generating circuit applies a compensating voltage to one of the first to third compensating coils corresponding to the one exciting coil and one of the two remaining compensating coils, excluding the one compensating coil, corresponding to the other remaining exciting coil of the two remaining exciting coils excluding the one exciting coil, so that a magnetic field output of the one remaining exciting coil is perpendicular to that of the one exciting coil. In order to generate perpendicular AC magnetic fields, when exciting the other remaining exciting coil of the two remaining exciting coils excluding the one exciting coil, the signal generating circuit applies a compensating voltage to one of the first to third compensating coils, corresponding to the one exciting coil, and one of the two remaining compensating coils, excluding the one compensating coil, corresponding to the one remaining exciting coil of the two remaining exciting coils excluding the one exciting coil, so that a magnetic field output of the other remaining exciting coil is perpendicular to magnetic field outputs of the one exciting coil and the one remaining exciting coil.

DESCRIPTION OF THE PREFERRED EMBODIMENTS

Figure 1:
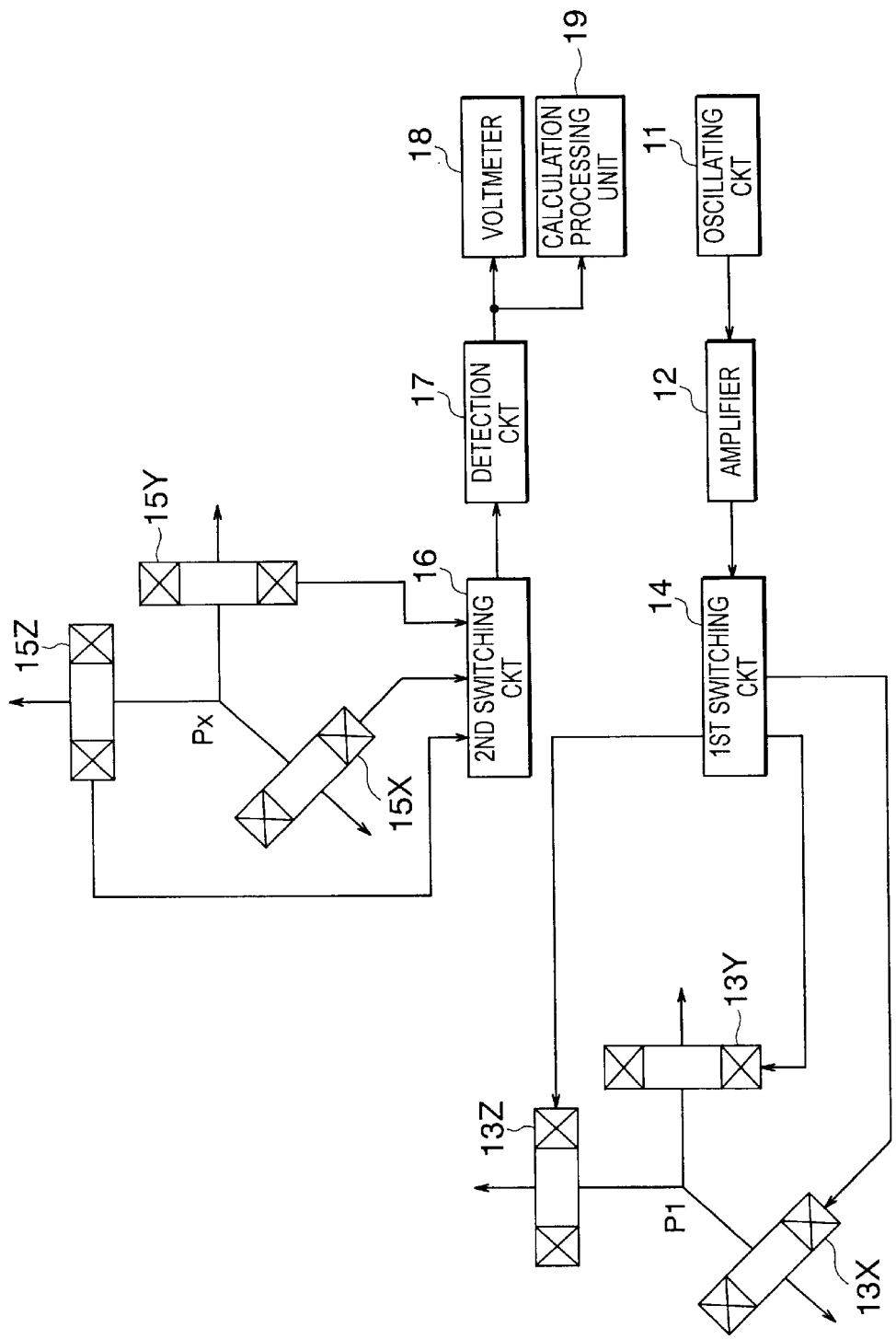
FIG. 1 is a diagram showing the structure of an azimuth measuring apparatus according to a first embodiment of the present invention.

Hereinbelow, according to a first embodiment of the present invention, an azimuth measuring apparatus will be described with reference to FIG. 1. Referring to FIG. 1, according to the first embodiment, the azimuth measuring apparatus comprises an oscillating circuit 11 for outputting an AC signal and an amplifier 12 for amplifying an output of the oscillating circuit 11, as a signal generating circuit. Although a frequency oscillated by the oscillating circuit 11 is preferably within an audible band, the present invention is not limited to this. The azimuth measuring apparatus comprises first to third exciting coils 13X to 13Z arranged at a predetermined reference position $P_1$ (hereinafter, referred to as a reference position $P_1$), which are integrally formed so that central axes thereof match perpendicular three axes of a triaxial coordinate system, respectively, and a first switching circuit 14 for sequentially exciting the first to third exciting coils 13X to 13Z in response to the output of the amplifier 12. Further, the azimuth measuring apparatus comprises first to third detecting coils 15X to 15Z arranged at a measuring subject position Px distant from the reference position $P_1$, which are integrally formed so that central axes thereof match perpendicular three axes of a triaxial coordinate system, respectively, and a second switching circuit 16 for sequentially extracting outputs of the first to third detecting coils 15X to 15Z. A voltage extracting circuit is connected to the second switching circuit 16. The voltage extracting circuit includes a detection circuit 17 for detecting the output extracted by the second switching circuit 16. An output of the detection circuit 17 is extracted as a voltage signal by a voltmeter 18 and is inputted to a calculation processing unit 19, which will be described later.

The positional relationship between the reference position $P_1$ and the measuring subject position Px is unknown. Namely, although the reference position $P_1$ is arranged at the predetermined position, the measuring subject position Px is arbitrarily determined and the first to third detecting coils 15X to 15Z may be arranged in any desired attitude. More specifically, it is unnecessary that the triaxial coordinate system of the first to third exciting coils 13X to 13Z do not match the triaxial coordinate system of the first to third detecting coils 15X to 15Z. Therefore, the integrated first to third detecting coils 15X to 15Z are not only arranged on the ground but also buried in underground and plunged in underwater. In this case, preferably, in accordance with a position at which the azimuth measuring apparatus is provided, the first to third exciting coils 13X to 13Z are connected to the first switching circuit 14 via a signal cable and the first to third detecting coils 15X to 15Z are connected to the second switching circuit 16 via a signal cable. This can be similarly applied to second to fourth embodiments, which will be described later.

According to the first embodiment, an operation of the azimuth measuring apparatus will be briefly described. When the first exciting coil 13X is excited, voltages induced in the first to third detecting coils 15X to 15Z are sequentially extracted. When the second exciting coil 13Y is excited, voltages induced in the first to third detecting coils 15X to 15Z are sequentially extracted. When the third exciting coil 13Z is excited, voltages induced in the first to third detecting coils 15X to 15Z are sequentially extracted. Based on a predetermined calculation, which will be described later, the azimuth of the measuring subject position Px from the reference position $P_1$ is determined by using all nine induced-voltages which are obtained by the first to third detecting coils 15X to 15Z.

Specifically speaking, the output of the oscillating circuit 11 is amplified, thereafter, the first switching circuit 14 sequentially switches the first to third exciting coils 13X to 13Z so as to excite them only for a predetermined time and, thus, magnetic fields are generated while the first to third exciting coils 13X to 13Z mutually have an angular relationship of 90°. When the first exciting coil 13X is excited, the detection circuit 17 and voltmeter 18 measure the voltages induced in the first to third detecting coils 15X to 15Z via the second switching circuit 16.

Next, when the second exciting coil 13Y is excited, voltages induced in the first to third detecting coils 15X to 15Z are measured. Similarly, when the third exciting coil 13Z is excited, voltage induced in the first to third detecting coils 15X to 15Z are measured. As a result of the measurement of the voltages, nine voltage data can be obtained.

Figure 2:
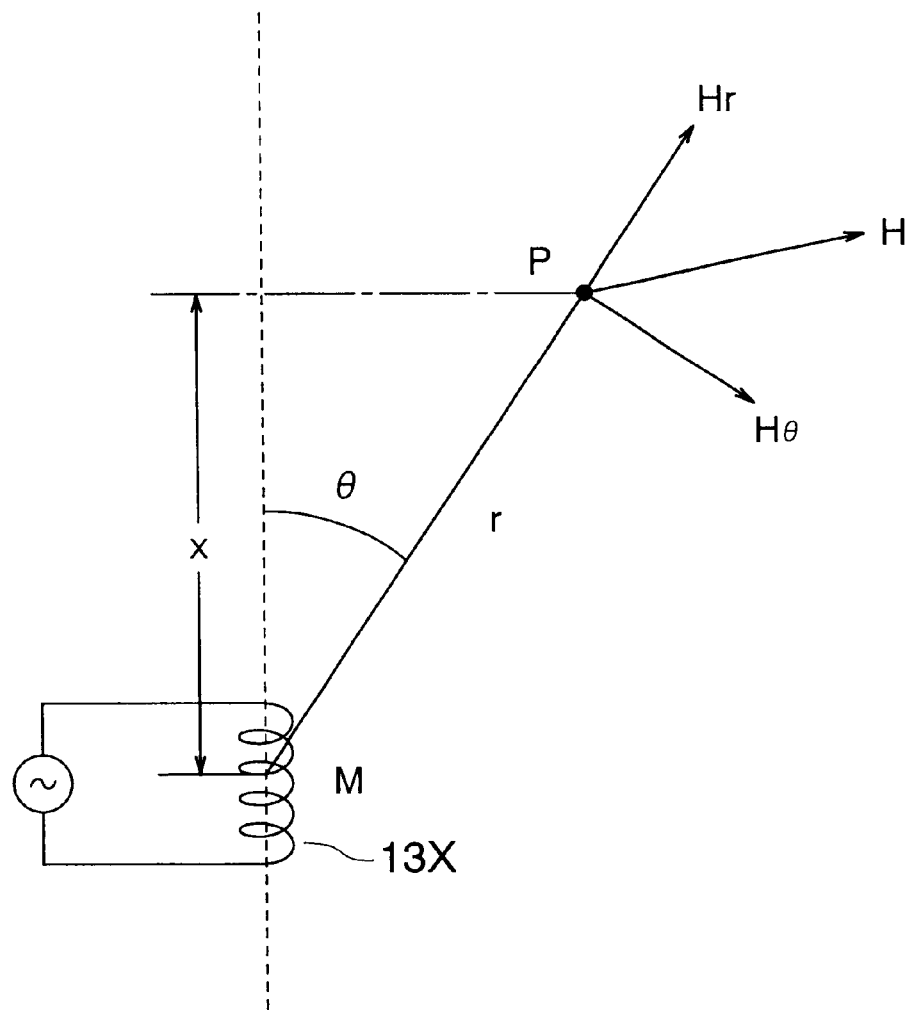
FIG. 2 is a diagram for explaining the principle of measuring an azimuth in the present invention.

FIG. 2 is a diagram for explaining the principle of measuring the azimuth in the present invention. It is assumed that reference symbol M denotes a magnetic moment which is generated by the first exciting coil 13X as an X-axis coil, reference symbol H denotes a magnetic field at a position P on the magnetic field produced by the magnetic moment M, reference symbol Hr denotes a magnetic field component in a segment r (distance) joining the first exciting coil 13X and the position P, and reference symbol $H_\theta$ denotes a magnetic field component which is perpendicular to the segment r and is directed to the outside of the central axis (herein, an X-axis). The relationship between Hr and $H_\theta$ is expressed by the following equations.

$$Hr = 2M \cdot \cos\theta / 4\pi \cdot \mu_0 \cdot \gamma^3 \qquad (1)$$

$$H_\theta = M \cdot \sin\theta / 4\pi \cdot \mu_0 \cdot r^3 \qquad (2)$$

The square of the magnetic field H is expressed by the following equation, where an equation of $kr = (M/4\pi \cdot \mu_0 \cdot r^3)$ is satisfied and reference symbol x denotes an X-axis component of the segment r.

$$\begin{aligned} H^2 &= Hr^2 + H_\theta^2 \\ &= kr^2(3\cos^2\theta + 1) \\ &= kr^2(3x^2/r^2 + 1) \end{aligned} \qquad (3)$$

Reference symbols $Eu_1$, $Ev_1$, and $Ew_1$ denote the voltages induced in the first to third detecting coils 15X to 15Z at one position when the X-axis coil (first exciting coil 13X) at another position is excited. The square $HX^2$ of the magnetic field when the X-coil is excited is expressed by the following expression, where reference symbol $\theta_1$ denotes an angle formed by the segment r and the X-axis and herein, reference symbol Ke denotes a constant of proportion when an angle θ is converted into a voltage.

$$\begin{aligned} Hx^2 &= kr^2(3\cos^2\theta_1 + 1) \\ &= Ke(Eu_1^2 + Ev_1^2 + Ew_1^2) \\ &= Ke \cdot Ex^2 \end{aligned} \qquad (4)$$

As will be obviously understood from the equation (4), an equation of $Ex^2 = (Eu_1^2 + Ev_1^2 + Ew_1^2)$ is defined. Reference symbols $Eu_2$, $Ev_2$, $Ew_2$ denote the voltages induced in the first to third detecting coils 15X to 15Z at the position P when the second exciting coil 13Y is excited, and reference symbols $Eu_3$, $Ev_3$, $Ew_3$ denote the voltages induced in the first to third detecting coils 15X to 15Z at the position P when the third exciting coil 13Z is excited. Equations of $Ey^2 = (Eu_2^2 + Ev_2^2 + Ew_2^2)$ and $Ez^2 = (Eu_3^2 + Ev_3^2 + Ew_3^2)$ are defined. When the equation (4) is solved for $Ex^2$, the following equation is obtained.

$$\begin{aligned} Ex^2 &= (kr^2/Ke) \cdot (3\cos^2\theta_1 + 1) \\ &= (kr^2/Ke) \cdot (3x^2/r^2 + 1) \end{aligned} \qquad (5)$$

The output voltage are expressed by the following equations when the second and third exciting coils 13Y and 13Z of the Y- and Z-axes are excited. Herein, reference symbols $\theta_2$ and $\theta_3$ denote angles formed by the segment r and the Y-axis and by the segment r and the Z-axis and reference symbols y, respectively, and z denote a Y-axis component of the segment r and a Z-axis component of the segment r.

$$Ey^2 = (kr^2/Ke) \cdot (3\cos^2\theta_2 + 1) \quad (6)$$
$$= (kr^2/Ke) \cdot (3y^2/r^2 + 1)$$

$$Ez^2 = (kr^2/Ke) \cdot (3\cos^2\theta_3 + 1) \quad (7)$$
$$= (kr^2/Ke) \cdot (3z^2/r^2 + 1)$$

If the equations (5) to (7) are added, the following equation is obtained.

$$Ex^2 + Ey^2 + Ez^2 = (kr^2/Ke) \cdot [3(x^2+y^2+z^2)/r^2 + 3] = 6(kr^2/Ke) \quad (8)$$

If the equation (8) is substituted for the equation (5), the following equation is obtained.

$$Ex^2 = (kr^2/Ke) \cdot (3\cos^2\theta_1 + 1) \quad (9)$$
$$= (Ex^2 + Ey^2 + Ez^1) \cdot (3\cos^2\theta_1 + 1)/6$$

If $\theta_1$ is calculated from the equation (9), the following equation is obtained.

$$3\cos^2\theta_1 = 6Ex^2/(Ex^2+Ey^2+Ez^2) - 1$$

$$\cos\theta_1 = [1/(3)^{1/2}] \cdot [6Ex^2/(Ex^2+Ey^2+Ez^2) - 1]^{1/2} \theta_1 = \cos^{-1}\{[1/(3)^{1/2}] \cdot [6Ex^2/(Ex^2+Ey^2+Ez^2) - 1]^{1/2}\} \quad (10)$$

Similarly, $\theta_2$ and $\theta_3$ of the Y- and Z-axes are expressed by the following equations.

$$\theta_2 = \cos^{-1}\{[1/(3)^{1/2}] \cdot [6Ey^2/(Ex^2+Ey^2+Ez^2) - 1]^{1/2}\} \quad (11)$$

$$\theta_3 = \cos^{-1}\{[1/(3)^{1/2}] \cdot [6Ez^2/(Ex^2+Ey^2+Ez^2) - 1]^{1/2}\} \quad (12)$$

As mentioned above, by measuring the voltages $Eu_1$ to $Eu_3$, $Ev_1$ to $Ev_3$, and $Ew_1$ to $Ew_3$ which are induced in the first to third detecting coils 15X to 15Z, the azimuth of the measuring subject position Px from the reference position $P_1$ is obtained only by the calculation of the equations (10) to (12).

In the above description, it is assumed that another apparatus performs the calculation by using the voltage values measured by the voltmeter 18. In place of the voltmeter 18, the calculation processing unit 19 having an A/D converting function may be used. In this case, the calculation processing unit 19 stores therein a program for the above calculation. The calculation processing unit 19 sequentially samples the nine voltage-values which are obtained by the detection circuit 17 via the second switching circuit 16 and performs the calculation by using the sampled values, thus determining the azimuth of the measuring subject position Px from the reference position $P_1$.

Incidentally, the first and second switching circuits 14 and 16 may be switched manually or automatically. Reference symbol t denotes a time for connecting one of the exciting coils 13X to 13Z to the first switching circuit 14. Then, preferably, a time for connecting one of the first to third detecting coils 15X to 15Z to the second switching circuit 16 is t/3.

Figure 3:
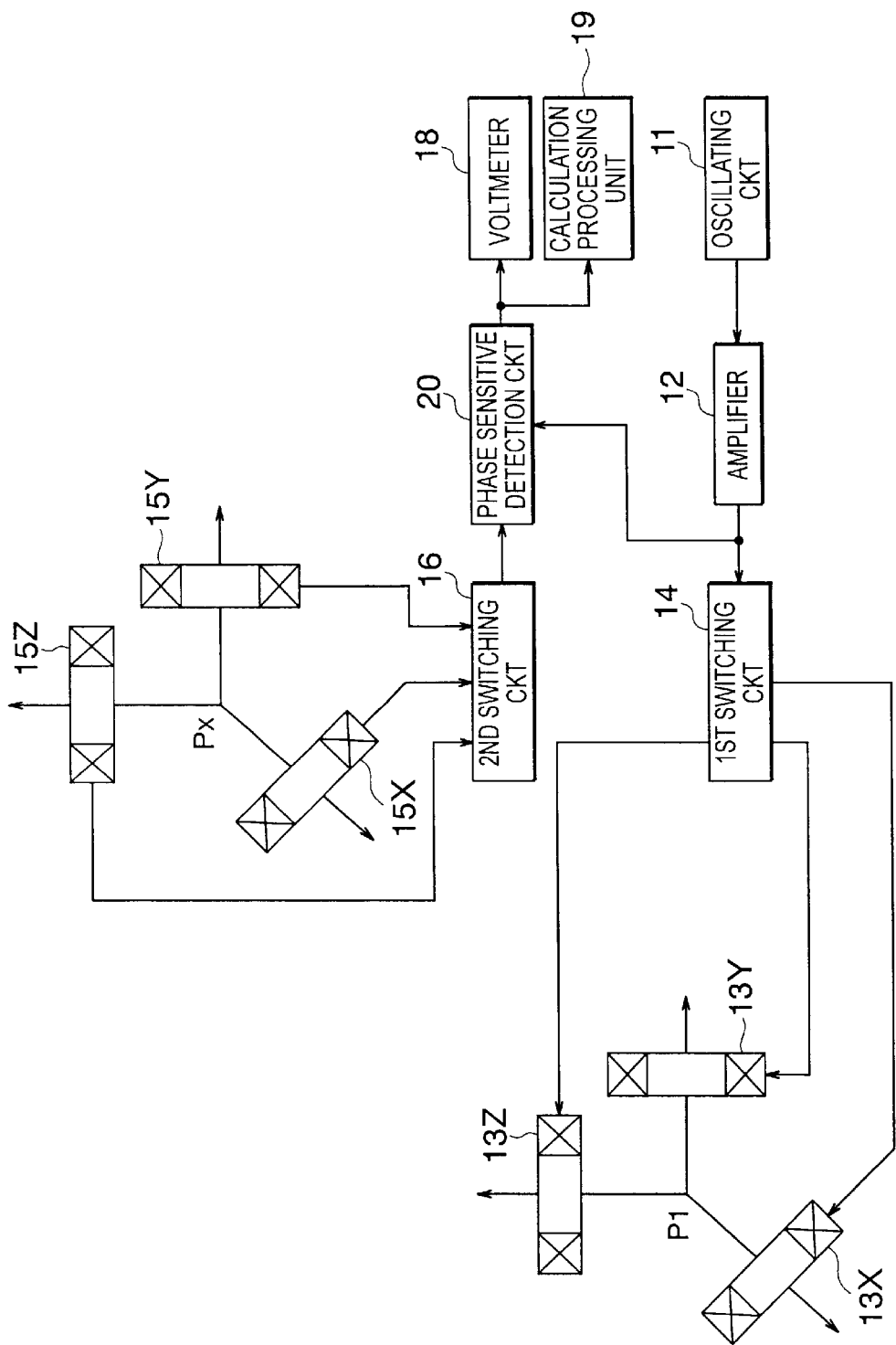
FIG. 3 is a diagram showing a modification of the structure of the azimuth measuring apparatus shown in FIG. 1 according to the first embodiment.

FIG. 3 shows a diagram showing a modification of the structure of the azimuth measuring apparatus shown in FIG. 1 according to the first embodiment, and the same portions as those in FIG. 1 are designated by the same reference numbers. In place of the detection circuit 17 in FIG. 1, the modification uses a phase sensitive detection circuit 20 for setting the output signal of the amplifier 12 as a detected signal. Even when an S/N ratio is decreased, an effect for removing noise components mixed in frequency components of the first to third detecting coils 15X to 15Z can be exhibited by using the phase sensitive detection circuit 20. In the azimuth measuring apparatus, operations are similar to those of FIG. 1, except for that of the phase sensitive detection circuit 20.

Figure 4:
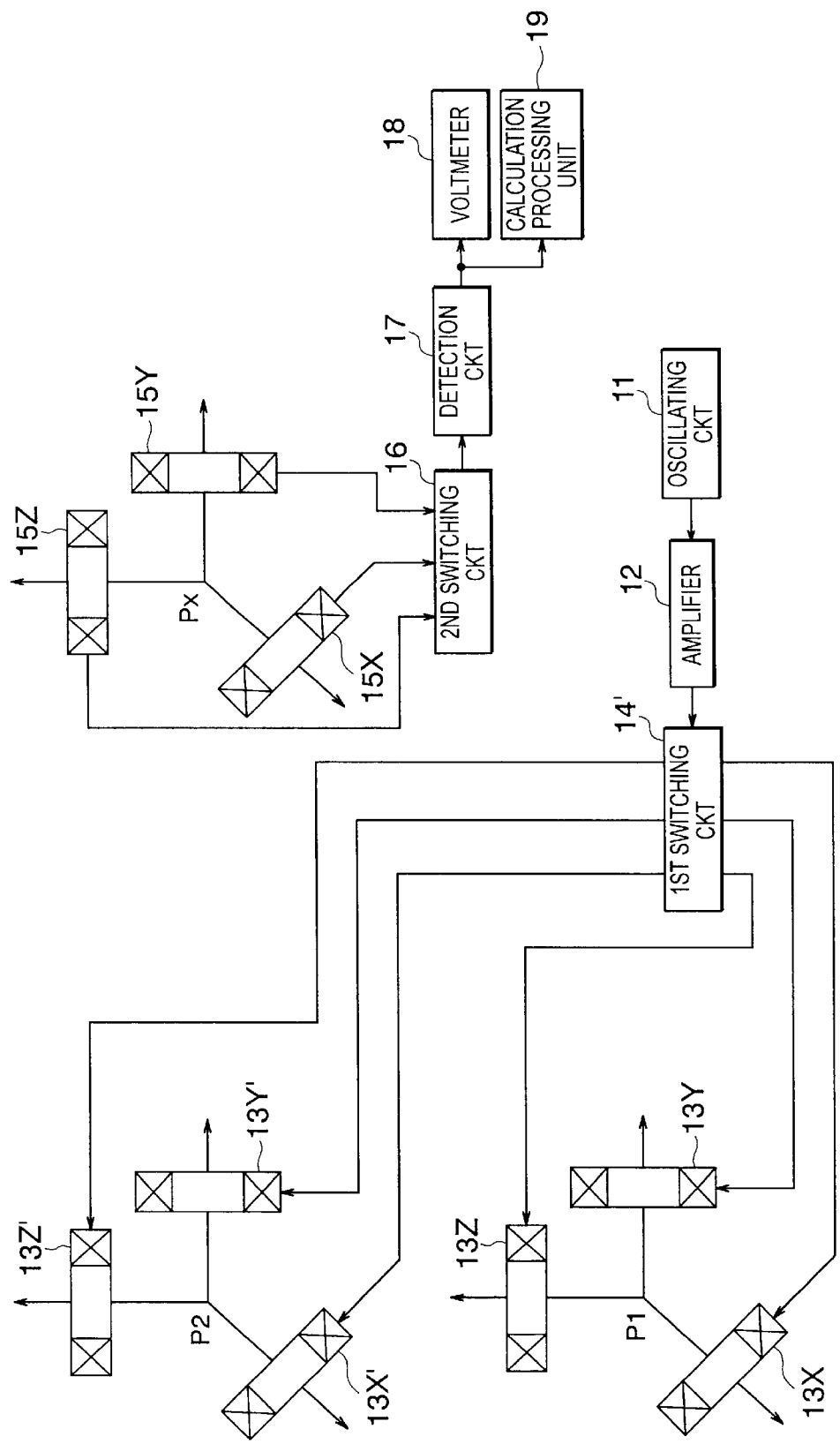
FIG. 4 is a diagram showing the structure of an azimuth measuring apparatus according to a second embodiment of the present invention.

FIG. 4 is a diagram showing the structure of an azimuth measuring apparatus according to a second embodiment of the present invention, and the same portions as those in FIG. 1 are designated by the same reference numbers. According to the second embodiment, the azimuth measuring apparatus also comprises an oscillating circuit 11 for outputting an AC signal and an amplifier 12 for amplifying an output of the oscillating circuit 11, as a signal generating circuit. The azimuth measuring apparatus comprises first to third exciting coils 13X to 13Z arranged at a predetermined first reference position $P_1$ (hereinafter, referred to as a first reference position $P_1$), which are integrally formed so that central axes thereof match three perpendicular axes of a first triaxial coordinate system. Further, the azimuth measuring apparatus comprises fourth to sixth exciting coils 13X' to 13Z' arranged at a second reference position $P_2$ distant from the first reference position $P_1$ by a predetermined distance, which are integrally formed so that central axes thereof match three perpendicular axes of a second triaxial coordinate system. On the second triaxial coordinate system, the three axes thereof are parallel to the three corresponding axes of the first triaxial coordinate system. Furthermore, the azimuth measuring apparatus comprises a first switching circuit 14' for sequentially exciting the first to sixth exciting coils 13X to 13Z and 13X' to 13Z' in response to output of the amplifier 12.

Similarly to the first embodiment, first to third detecting coils 15X to 15Z are arranged at a measuring subject position Px distant from the first and second reference positions $P_1$ and $P_2$ and are integrally formed so that central axes thereof match three perpendicular axes of a triaxial coordinate system. Of course, the measuring subject position Px is arbitrarily determined and the first to third detecting coils 15X to 15Z may be arranged in any desired attitude.

The azimuth measuring apparatus comprises a second switching circuit 16 for sequentially extracting outputs of the first to third detecting coils 15X to 15Z and a detection circuit 17 as a voltage extracting circuit for obtaining a voltage signal from the outputs extracted by the second switching circuit 16.

According to the second embodiment, when the first exciting coil 13X is excited, voltages induced in the first to third detecting coils 15X to 15Z are sequentially extracted. When the second exciting coil 13Y is excited, voltages induced in the first to third detecting coils 15X to 15Z are sequentially extracted. When the third exciting coil 13Z is excited, voltages induced in the first to third detecting coils 15X to 15Z are sequentially extracted. When the fourth exciting coil 13X' is excited, voltages induced in the first to third detecting coils 15X to 15Z are sequentially extracted. When the fifth exciting coil 13Y' is excited, voltages induced in the first to third detecting coils 15X to 15Z are sequentially extracted. When the sixth exciting coil 13Z' is excited, voltages induced in the first to third detecting coils 15X to 15Z are sequentially extracted.

A first azimuth of the measuring subject position Px from the first reference position $P_1$ and a second azimuth of the measuring subject position Px from the second reference position $P_2$ are determined based on a predetermined calculation by using all eighteen induced-voltages which are obtained by the first to third detecting coils 15X to 15Z.

Specifically speaking, the first azimuth of the measuring subject position Px from the first reference position $P_1$ is determined, based on the equations (10) to (12) in the first embodiment, by using the nine induced-voltages which are obtained by the first to third detecting coils 15X to 15Z when the first to third exciting coils 13X to 13Z are excited. The second azimuth of the measuring subject position Px from the second reference position $P_2$ is determined, based on the equations (10) to (12) in the first embodiment, by using the nine induced-voltages which are obtained by the first to third detecting coils 15X to 15Z when the fourth to sixth exciting coils 13X' to 13Z' are excited.

After determining the first azimuth of the measuring subject position Px from the first reference position $P_1$ and the second azimuth of the measuring subject position Px from the second reference position $P_2$, it is possible to determine the position of the measuring subject position Px on the triaxial coordinate system, as a reference coordinate system, of the first reference position $P_1$ (or the second reference position $P_2$) by using the first and second azimuths determined and the aforementioned predetermined distance.

That is, since the azimuths of the measuring subject position Px from the two reference positions $P_1$ and $P_2$ on a three-dimensional space can be determined by setting the reference positions shown in FIG. 1 to be two ones, the measuring subject position Px is determined on the three-dimensional coordinate system if the distance between the first and second reference positions $P_1$ and $P_2$ is known.

Although it is assumed in the second embodiment that in different devices, the equations (10), (11), and (12) are calculated twice by using the voltage values measured by the voltmeter 18, instead of the voltmeter 18, a calculation processing unit 19 having an A/D converting function may be connected. In this case, the calculation processing unit 19 stores therein a program of the above calculation and a calculating program for coordinate position. The calculation processing unit 19 sequentially samples eighteen voltage values which are obtained by the detection circuit 17 via the second switching circuit 16 and performs the calculation by using the sampled value, thus calculating the first azimuth of the measuring subject position Px from the first reference position $P_1$, the second azimuth of the measuring subject position Px from the second reference position $P_2$, and the coordinate position of the measuring subject position Px.

Incidentally, a modification of the structure of the azimuth measuring apparatus according to the second embodiment is considered as follows.

Figure 5:
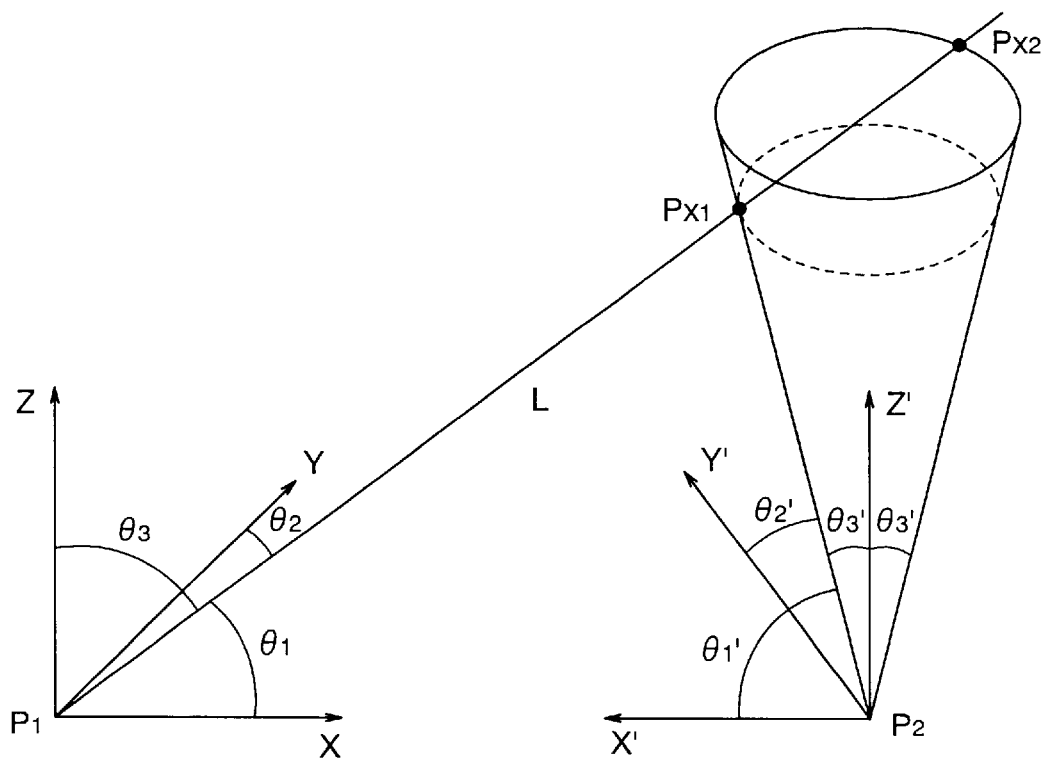
FIG. 5 is a diagram for explaining a modification of the structure of the azimuth measuring apparatus in FIG. 4 according to the second embodiment.

Referring to FIG. 5, the triaxial coordinate system of the first reference position $P_1$ is formed by X-, Y-, and Z-axes, and a triaxial coordinate system of the second reference position $P_2$ is formed by X'-, Y'-, and Z'-axes. In this case, based on the calculation of the equations (10) to (12), angles $\theta_1$ to $\theta_3$ formed by the X-, Y-, and Z-axes and the measuring subject position Px with reference to the first reference position $P_1$ are determined by using the nine induced-voltages in the first to third detecting coils 15X to 15Z when the first to third exciting coils 13X to 13Z are excited. Sequentially, based on the calculation of the equations (10) to (12), angles $\theta_1'$ to $\theta_3'$ formed by the X'-, Y'-, and Z'-axes and the measuring subject position Px with reference to the second reference position $P_2$ are determined by using the nine induced-voltages which are obtained by the first to third detecting coils 15X to 15Z when the fourth to sixth exciting coils 13X' to 13Z' are excited.

In this case, with reference to either the first reference position $P_1$ or the second reference position $P_2$, the coordinate position of the measuring subject position Px can be determined by using all three angles including at least one of the angles $\theta_1$ to $\theta_3$ regarding the first reference position $P_1$ and at least one regarding the angles $\theta_1'$ to $\theta_3'$ of the second reference position $P_2$ and the coordinate positions of the first and second reference positions $P_1$ and $P_2$.

The foregoing is based on the following reasons. In the case of the modification shown in FIG. 5, a segment L is determined depending on the angles $\theta_1$ and $\theta_2$ regarding the first reference position $P_1$. Crossings $Px_1$ and $Px_2$ are determined depending on the segment L and the angle $\theta_3'$ regarding the second reference position $P_2$. Herein, with respect to the first reference position $P_1$, the angles $\theta_1$ to $\theta_3$ are not independent and the angle $\theta_3$ is determined depending on the angles $\theta_1$ and $\theta_2$. Thus, all of the angles $\theta_1$ to $\theta_3$ and $\theta_1'$ to $\theta_3'$ are unnecessary in the calculation of the measuring subject position Px and the calculated results of the two coordinate positions of the crossings $Px_1$ and $Px_2$ are obtained. However, since the coordinate positions of the first and second reference positions $P_1$ and $P_2$ are known and the distance therebetween is also known, it can be identified that the coordinate position of the crossing $Px_1$ corresponds to those of the measuring subject position Px in FIG. 5.

Of course, in the method for selecting all the three angles, any combination of the angles may be used under the condition that the angles include at least one of the angles $\theta_1$ to $\theta_3$ and at least one of the angles $\theta_1'$ to $\theta_3'$ and the number of angles is three.

In the azimuth measuring apparatus according to the first and second embodiments, the measuring subject position can be set at a position distant from the reference position by several tens or more meters and the measuring subject position may be arranged not only on the ground but also in underground and underwater. The above-described azimuth measuring apparatus can perform the measurement, in underground and underwater, which cannot be performed by the optical measuring equipment, and can measure the displacement in underground and the displacement of the slope in underwater. Therefore, it is possible to detect the sign indicating that a slip of a slope is caused and the slope slides, and also to alarm the danger of the slide when the slip of the slope is found, not when the slope slides.

In the azimuth measuring apparatus, the azimuth of the measuring subject position from the reference position can be determined on the three-dimensional space. The azimuth of the measuring subject position from the respective reference position can be determined by setting the two reference positions, and the coordinate position of the measuring subject position can further be determined on the three-dimensional space by using the distance between the reference position and the measuring subject position. Since the frequency of the oscillating circuit has an audible band and, then, electromagnetic waves generated by the exciting coils mainly include magnetic filed components, the amount of attenuation of electromagnetic waves is smaller in underground and underwater, as compared with electromagnetic waves, having a high-frequency band, mainly including electric field components, and the coordinate can be determined even in underground and underwater. The detecting coils arranged at the measuring subject position detect the magnitude of the magnetic field and even the rotation of the detecting coils themselves does not affect the measured results. Since $Ex_2$, $Ey_2$, and $Ez_2$ substituted for the equations for calculating the angles $\theta_1$ to $\theta_3$ formed by the reference position and the from the X-, Y-, and Z-axes, respectively, designate the sums of squares of effective values of the detected values Eu, Ev, and Ew generated in the detecting coils and become DC voltages, it is advantageous for analog and digital processes. If the synchronous detection is executed with reference to excited current, the square of the detected voltages is obtained and an effect to remove noises is increased, it is advantageous for signal characteristics against the noises.

In the azimuth measuring apparatus, it is difficult that central axes of the first to third exciting coils 13X to 13Z match the three perpendicular axes of a triaxial coordinate system, and deviation of the angle is inevitably caused. In addition, materials, as a core, having a high magnetic permeability such as a ferrite is used to increase the strength of the AC magnetic field in the first to third exciting coils 13X to 13Z. In this case, it is necessary to actually keep the perpendicularity of the magnetic field including the characteristics of the core materials. However, it is hard to actually obtain the perpendicularity of the magnetic field only under the condition that the shapes of the first to third exciting coils 13X to 13Z are perpendicular.

Figure 6:
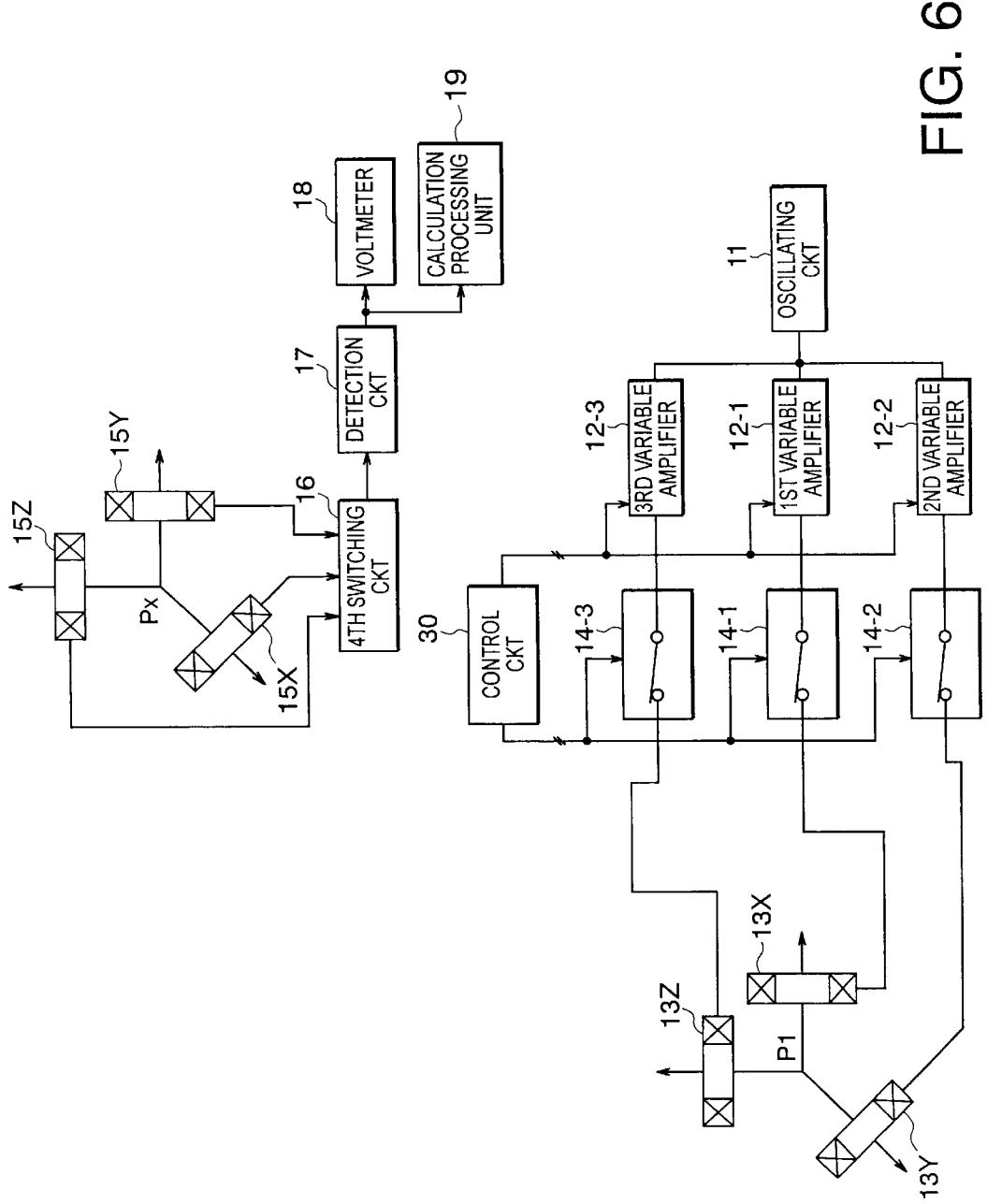
FIG. 6 is a diagram showing the structure of an azimuth measuring apparatus according to a third embodiment of the present invention.

FIG. 6 is a diagram showing the structure of an azimuth measuring apparatus according to a third embodiment of the present invention. According to the third embodiment, the structure between an oscillating circuit 11 and first to third exciting coils 13X to 13Z, that is, the structure excluding a signal generating circuit is the same as that of the azimuth measuring apparatus shown in FIG. 1. Therefore, referring to FIG. 6, the same portions as those in FIG. 1 are designated by the same reference numbers. Operations of first to third detecting coils 15X to 15Z are similar to those in FIG. 1 and a description thereof is omitted.

The signal generating circuit comprises an oscillating circuit 11, and first to third variable output amplifiers 12-1 to 12-3 for amplifying outputs of the oscillating circuit 11. Further, the signal generating circuit comprises first to third switching circuits 14-1 to 14-3 connected to output terminals of the first to third variable output amplifiers 12-1 to 12-3, for supplying outputs thereof to the first to third exciting coils 13X to 13Z, respectively. Furthermore, the signal generating circuit comprises a control circuit 30 for controlling the outputs of the first to third variable output amplifiers 12-1 to 12-3 so that they become either an output level for excitation of the first to third exciting coils 13X to 13Z or an output level for a compensating voltage which is sufficiently lower than the output level therefor, and for controlling a switching operation of the first to third switching circuits 14-1 to 14-3. Information for the above control is preset in the control circuit 30 and the set information can be arbitrarily changed.

The outputs of the oscillating circuit 11 are inputted to the first to third variable output amplifiers 12-1 to 12-3, and the first to third switching circuits 14-1 to 14-3 apply voltages to the first to third exciting coils 13X to 13Z. In this case, the compensating voltage lower than a main exciting voltage for azimuth measurement is applied to the exciting coils other than the exciting coil which is excited for azimuth measurement (hereinafter, referred to as a main exciting coil). Usually, the compensating voltage uses a voltage of 1 to 2% of the main exciting voltage.

Referring to FIG. 6, the first variable output amplifier 12-1 applies the main exciting voltage to the first exciting coil 13X as the main exciting coil. The second and third variable output amplifiers 12-2 and 12-3 are connected to the second and third exciting coils 13Y and 13Z, and thus apply the compensating voltage lower than the main exciting voltage to the second and third exciting coils 13Y and 13Z, respectively.

Incidentally, any of the first to third exciting coils 13X to 13Z is set as a reference exciting coil. For example, if the first exciting coil 13X is set as the reference exciting coil, the operation is as follows.

That is, in the control circuit 30, when the main exciting voltage is applied to the first exciting coil 13X, in other words, when the main exciting coil is the first exciting coil 13X, as shown in FIG. 6, the second and third variable output amplifiers 12-2 and 12-3 are connected to the second and third exciting coils 13Y and 13Z and thus apply the compensating voltage lower than the main exciting voltage to the second and third exciting coils 13Y ad 13Z, respectively.

Next, when the main coil is the second exciting coil 13Y, the control circuit 30 sets a connecting status in which the compensating voltage is applied to the first and third exciting coils 13X and 13Z. When the main exciting coil is the third exciting coil 13Z, the control circuit 30 sets a connecting status in which the compensating voltage is applied to the first and second exciting coils 13X and 13Y. These connecting statuses are set because when the main exciting coil is the second exciting coil 13Y, correction is performed so that a magnetic field output of the second exciting coil 13Y is perpendicular to that of the first exciting coil 13X. Also, the correction is performed so that when the main exciting coil is the third exciting coil 13Z, a magnetic filed output of the third exciting coil 13Z is perpendicular to those of the first and second exciting coils 13X and 13Y Consequently, AC magnetic fields perpendicular to each other are generated. The above description means that if the central axes of the second and third exciting coils 13Y and 13Z slightly deviate from the central axis of the first exciting coil 13X, the AC magnetic fields perpendicular to each other are generated.

When the first exciting coil 13X is the reference exciting coil and it is also set as the main exciting coil, the compensating voltage may be not applied to the second and third exciting coils 13Y and 13Z in some cases. This is because when the first exciting coil 13X is the reference exciting coil, the magnetic field generated by the first exciting coil 13X is set as a reference magnetic field and the magnetic filed generated by the second or third exciting coil 13Y or 13Z may be perpendicular to the reference magnetic field. However, even when the magnetic field of the first exciting coil 13X is the reference one, when the central axis of the first exciting coil 13X does not match one axis of the three axes, an error might be caused. In the case of taking account of the mismatching, even if the first exciting coil 13X is the reference exciting coil and the first exciting coil 13X is the main exciting coil, the compensating voltage is applied to the second and third exciting coils 13Y and 13Z.

When the second exciting coil 13Y is the reference exciting coil and it is also set as the main exciting coil, the compensating voltages may be not applied to the first and third exciting coils 13X and 13Z in some cases because of the above-mentioned operations. Similarly, when third exciting coil 13Z is the reference exciting coil and it is also set as the main exciting coil, the compensating voltages may be not applied to the first and second exciting coils 13X and 13Y in some cases.

Further, when the second exciting coil 13Y is the reference exciting coil, the operation is as follows. That is, when the main exciting voltage is applied to the second exciting coil 13Y, namely, when the main exciting coil is the second exciting coil 13Y, the control circuit 30 connects the first and third variable output amplifiers 12-1 and 12-3 to the first and third exciting coils 13X and 13Z, thus applying the compensating voltage lower than the main exciting voltage. When the main exciting coil is the first exciting coil 13X, the control circuit 30 sets a connecting status in which the compensating voltage is applied to the second and third exciting coils 13Y and 13Z. When the main exciting coil is the third exciting coil 13Z, the control circuit 30 sets a connecting status in which the compensating voltage is applied to the first and second exciting coils 13X and 13Y.

As described above, when the main exciting coil is the first exciting coil 13X, correction is performed so that the magnetic filed output of the first exciting coil 13X is perpendicular to the magnetic field output of the second exciting coil 13Y When the main exciting coil is the third exciting coil 13Z, correction is performed so that the magnetic filed output of the third exciting coil 13Z is perpendicular to the magnetic field outputs of the first and second exciting coils 13X and 13Y.

Furthermore, when the third exciting coil 13Z is the reference exciting coil, the principle is similar to the foregoing and, therefore, a description thereof is omitted.

The operations for azimuth measurement is the same as those in FIG. 1. More specifically, by measuring the voltages $Eu_1$, $Ev_1$, and $Ew_1$ induced in the first to third detecting coils 15X to 15Z and executing the calculation of the equations (10) to (12), the azimuth of the measuring subject position Px from the reference position $P_1$ can be determined. Therefore, a detailed description of the operations is omitted.

Hereinbelow, an azimuth measuring apparatus according to a fourth embodiment of the present invention will be described with reference to FIG. 7. According to the fourth embodiment, the structure between an oscillating circuit 11 and first to third exciting coils 13X to 13Z, namely, the structure excluding a signal generating circuit and first to third compensating coils 21X to 21Z is similar to that of the azimuth measuring apparatus shown in FIG. 1. Consequently, referring to FIG. 7, the same portions as those in FIG. 1 are designated by the same reference numbers. The operations of the first to third detecting coils 15X to 15Z are similar to those in FIG. 1 and a description thereof is omitted.

The signal generating circuit comprises the oscillating circuit 11 and first to third variable output amplifiers 12-1 to 12-3 for amplifying outputs of the oscillating circuit 11. Further, the signal generating circuit comprises first to third switching circuits 14-1' to 14-3' connected to output sides of the first to third variable output amplifiers 12-1 to 12-3, for switching the first to third exciting coils 13X to 13Z and the first to third compensating coils 21X to 21Z and for supplying outputs of the first to third variable output amplifiers 12-1 to 12-3. The control circuit 30 controls the outputs of the first to third variable output amplifiers 12-1 to 12-3 so that they become either an output level for excitation of the first to third exciting coils 13X to 13Z or an output level for a compensating voltage which is sufficiently lower than the output level therefor, and also controls a switching operation of the first to third switching circuits 14-1' to 14-3'.

The first to third compensating coils 21X to 21Z are wound to central axes of the first to third exciting coils 13X to 13Z, respectively.

The outputs of the oscillating circuit 11 are inputted to the first to third variable output amplifiers 12-1 to 12-3. The first to third switching circuits 14-1' to 14-3' apply voltages to the first to third exciting coils 13X to 13Z and the first to third compensating coils 21X to 21Z. In this case, the compensating voltage, which is lower than a main exciting voltage, for azimuth measurement is applied to the compensating coil corresponding to one exciting coil for azimuth measurement other than the main exciting coil. As mentioned above, the compensating voltage uses a voltage of 1 to 2% of the main exciting voltage. Incidentally, the ratio of winding of the exciting coil to the compensating coil is, for example, 100 to 1.

Figure 7:
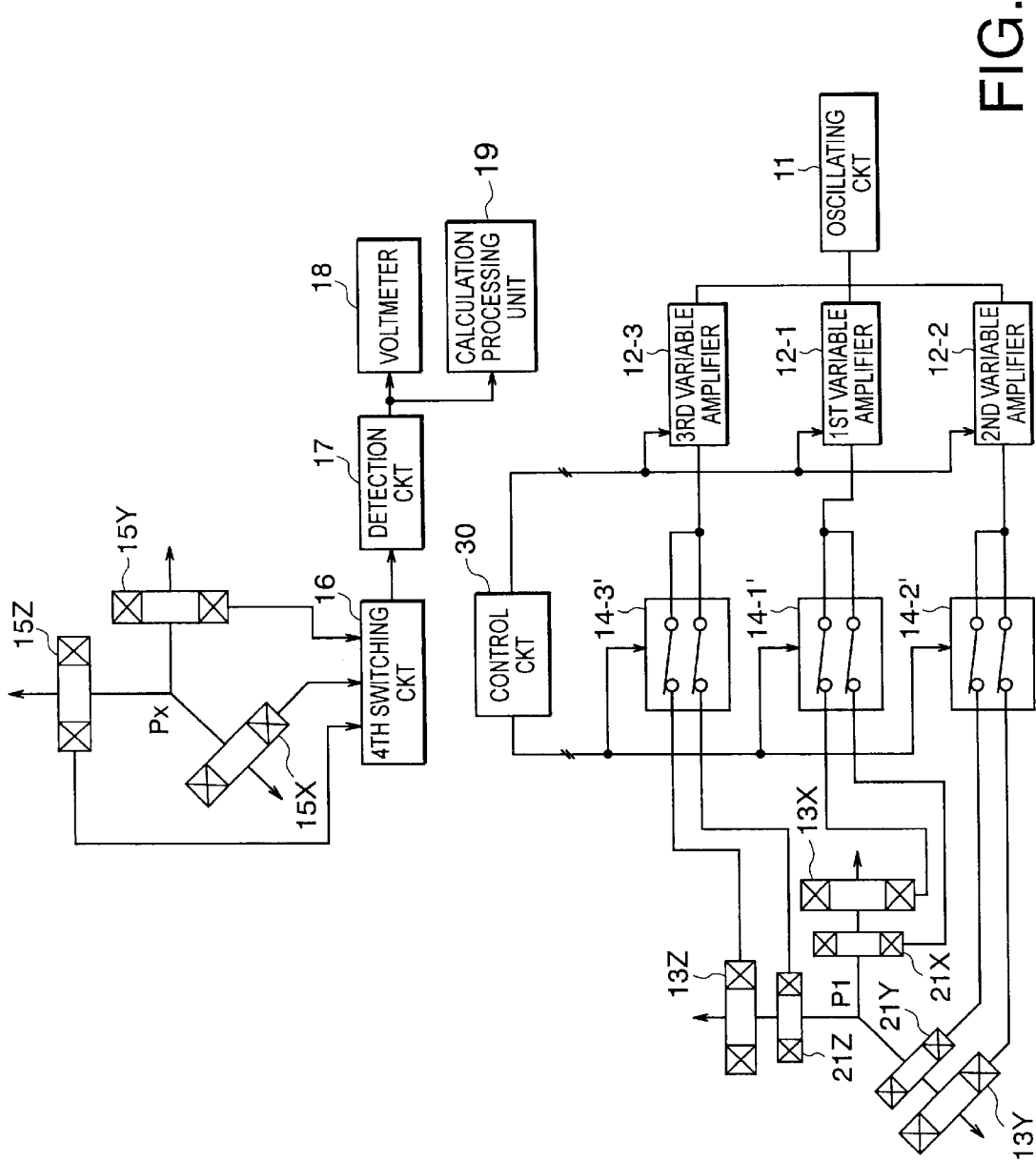
FIG. 7 is a diagram showing the structure of an azimuth measuring apparatus according to a fourth embodiment of the present invention.

FIG. 7 shows a connecting status in which the first exciting coil 13X is the main exciting coil and the first variable output amplifier 12-1 applies the main exciting voltage. Also, in FIG. 7, the second and third variable output amplifiers 12-2 and 12-3 are connected to the second and third compensating coils 21Y and 21Z corresponding to the second and third exciting coils 13Y and 13Z and the compensating voltages lower than the main exciting voltage are applied.

According to the fourth embodiment, any of the first to third exciting coils 13X to 13Z is set as a reference exciting coil. If the first exciting coil 13X is the reference exciting coil, the operation is as follows.

That is, when the main exciting voltage is applied to the first exciting coil 13X, namely, when the main exciting coil is the first exciting coil 13X, as shown in FIG. 7, the control circuit 30 connects the second and third variable output amplifiers 12-2 and 12-3 to the second and third compensating coils 21 Y and 21Z corresponding to the second and third exciting coils 13Y and 13Z, and the compensating voltages lower than the main exciting voltage are applied.

When the main exciting coil is the second exciting coil 13Y, the control circuit 30 sets a connecting status in which the compensating voltages are applied to the first and third compensating coils 21X and 21Z corresponding to the first and third exciting coils 13X and 13Z. When the main exciting coil is the second exciting coil 13Z, the control circuit 30 sets a connecting status in which the compensating voltages are applied to the first and second compensating coils 21X and 21Y corresponding to the first and second exciting coils 13X and 13Y. As mentioned in the third embodiment, the above connection is set because when the main exciting coil is the second exciting coil 13Y, the correction is performed so that the magnetic field output of the second exciting coil 13Y is perpendicular to the magnetic field output of the first exciting coil 13X. Also, when the main exciting coil is the third exciting coil 13Z, the correction is performed so that the magnetic field output of the third exciting coil 13Z is perpendicular to the magnetic field outputs of the first and second exciting coil 13X and 13Y. As a result, the AC magnetic fields perpendicular to each other are caused in a manner similar to the third embodiment.

For the reason mentioned in the third embodiment, when the first exciting coil 13X is the reference exciting coil and it is also set as the main exciting coil, the compensating voltages may be not applied to the second and third exciting coils 21Y and 21Z in some cases. When the second exciting coil 13Y is the reference exciting coil and it is set as the main exciting coil, the compensating voltages may be not applied to the first and third exciting coils 21X and 21Z in some cases. Similarly, when the third exciting coil 13Z is the reference exciting coil and it is also set as the main exciting coil, the compensating voltages may be not applied to the first and second exciting coils 21X and 21Y in some cases.

Incidentally, according to the third embodiment, referring to FIG. 6, by preparing two sets of the three exciting coils, arranging them at two positions, and setting two reference positions, the azimuth of the measuring subject position from the two reference positions can be obtained in the three-dimensional space. Since the space between the two reference positions is known, obviously, the measuring subject position can be obtained in the three-dimensional space. The operations for determining the measuring subject position is described in detail in the structure shown in FIG. 4 according to the second embodiment and in the modification shown in FIG. 5 according to the second embodiment. Of course, the above description can also be applied to the fourth embodiment.

According to the fourth embodiment, referring to FIG. 7, the similar effect is obtained in the case in which the first to third exciting coils 13X to 13Z and the first to third compensating coils 21X to 21Z wound to the axes different from the arranged axes thereof are serially connected. It is obvious to use a connecting status in which the generating direction of the magnetic field of the second exciting coil 13Y is compensated for by serially connecting one of the first compensating coil 21X and the third compensating coil 21Z to the second exciting coil 13Y, alternatively, by serially connecting both the first compensating coil 21X and the third compensating coil 21Z to the second exciting coil 13Y The above description is similar to a case of the third exciting coil 13Z. Although the compensating voltage is sufficiently lower than the main exciting voltage in the fourth embodiment, correction using the compensating voltage having a level similar to that of the main exciting voltage can be performed by further decreasing the number of windings of the first to third compensating coils 21X to 21Z. In this case, the output may be fixed in the first to third variable output amplifier 12-1 to 12-3.

Although the control circuit automatically switches the output levels of the first to third variable output amplifiers and the first to third switching circuits in the third and fourth embodiments, these switching operations may be manually executed without the control circuit.

As mentioned above, in the azimuth measuring apparatus according to the third and fourth embodiments, the following effects are obtained. When any of the exciting coils of the three axes is excited as the main exciting coil so as to make the magnetic field generating direction of the exciting coils perpendicular thereto, a fine voltage is applied to the exciting coil in the direction different from that of the main exciting coil or to the compensating coil, thereby correcting the direction of the magnetic field generated in the main exciting coil. Consequently, magnetic fields perpendicular to each other can be easily generated. In addition, in the manufacture of the azimuth measuring apparatus, the assembly of the three exciting coils requires no accuracy, and not only the arrangement of magnetic materials but also the compensation for magnetic characteristics is facilitated.

Hereinbelow, a description is given of a position measuring apparatus according to a first embodiment of the present invention with reference to FIG. 8. The position measuring apparatus in FIG. 8 has the structure similar to that of the azimuth measuring apparatus shown in FIG. 1. The position measuring apparatus comprises an oscillating circuit 11 for outputting an AC signal and an amplifier 12 for amplifying outputs of the oscillating circuit 11, as a signal generating circuit. Although, preferably, a frequency of the oscillating circuit 11 is within an audible band, the present invention is not limited to this. Further, the position measuring apparatus comprises first to third exciting coils 13X to 13Z arranged at a first known position (hereinafter, referred to as a first position) $P_1$, which are integrally formed so as to be combined to perpendicular X-, Y-, and Z-axes of a triaxial coordinate system, and a first switching circuit 14 for sequentially exciting the first to third exciting coils 13X to 13Z in response to the output of the amplifier 12. Furthermore, the position measuring apparatus comprises first to third detecting coils 15X to 15Z arranged at a second known position (hereinafter, referred to as a second position) $P_2$ distant from the first position $P_1$ by a predetermined distance $r_0$, which are integrally formed so as to be combined to perpendicular X-, Y-, and Z-axes of a triaxial coordinate system, and a second switching circuit 16 for sequentially extracting outputs of the first to third detecting coils 15X to 15Z. A voltage extracting circuit is connected to the second switching circuit 16. The voltage extracting circuit includes a detection circuit 17 for detecting the output of the second switching circuit 16. An output of the detection circuit 17 is extracted as a voltage signal by a voltmeter 18 and is inputted to a calculation processing unit 19, which will be described later.

The positional relationship between the first position $P_1$ and the second position $P_2$ is known, and the first to third exciting coils 13X to 13Z and the first to third detecting coils 15X to 15Z may be arranged in any desired attitude. In other words, it is unnecessary that the triaxial coordinate system of the first to third exciting coils 13X to 13Z match the triaxial coordinate system of the first to third detecting coils 15 X to 15Z because the integrated first to third detecting coils 15X to 15Z are not only arranged on the ground but also buried in underground and plunged in underwater. In this case, in accordance with the set position of the position measuring apparatus in the first embodiment, the first to third exciting coils 13X to 13Z are connected to the first switching circuit 14 via a signal cable and the first to third detecting coils 15X to 15Z are connected to the second switching circuit 16 via a signal cable. This connecting manner is similar in all examples, which will described later.

The position measured apparatus in the first embodiment detects that the first to third detecting coils 15X to 15Z at the second position $P_2$ are moved at a third position $P_3$ due to some reason and, in this case, it measures a distance $r_1$, from the first position $P_1$ to the third position $P_3$ and a coordinate position of the third position $P_3$.

Operations of the position measuring apparatus in the first embodiment will be briefly described. First, the first exciting coil 13X is excited and voltages induced in the first to third detecting coils 15X to 15Z are sequentially extracted. The third exciting coil 13Z is excited and voltages induced in the first to third detecting coils 15X to 15Z are sequentially extracted.

Based on a predetermined calculation, which will be described later, the distance $r_1$ from the first position $P_1$ to the third position $P_3$ and the coordinate position of the third position $P_3$ are determined by using all nine induced-voltages in the first to third detecting coils 15X to 15Z.

Specifically speaking, the amplifier 12 amplifies the output of the oscillating circuit 11 and, thereafter, the first switching circuit 14 sequentially switches the first to third exciting coils 13X to 13Z so as to excite them for a predetermined time, thus generating magnetic fields with the mutual relationship of an angle of 90°. When the first exciting coil 13X is excited, the detection circuit 17 and the voltmeter 18 measure the voltages induced in the first to third detecting coils 15X to 15Z via the second switching circuit 16.

Next, when the second exciting coil 13Y is excited, voltages induced in the first to third detecting coils 15X to 15Z are measured. Similarly, when the third exciting coil 13Z is excited, voltage induced in the first to third detecting coils 15X to 15Z are measured. As a detected result of the voltages, all the nine voltage-data are obtained.

As described in FIGS. 1 and 2, based on the calculation of the equations (10) to (12), the azimuth from the first position $P_1$ to the second position $P_2$ can be determined by using all the nine voltage-data. Similarly, even if the first to third detecting coils 15X to 15Z are moved at the third position $P_3$, the azimuth from the first position $P_1$ to the third position $P_3$.

Further, if an equation of (kr=M/4πμ$_0$r$^3$) which is defined in association with the above equation (3) is substituted for the equation (8), the following equation is obtained.

$$E = (Ex^2 + Ey^2 + Ez^2)^{1/2} = Kr^3 \quad (13)$$

Herein, reference symbol K denotes {(6/Ke)$^{1/2}$}(M/4πμ$_0$) Based on the equation (13), the square root of ($Ex^2 + Ey^2 + Ez^2$) is in inverse proportion to a distance r, to the third power, between the origins on the triaxial coordinate systems formed by the set of the first to third exciting coils 13X to 13Z and by the set of the first to third detecting coils 15X to 15Z.

Referring back to FIG. 8, reference symbol $r_0$ denotes a known predetermined distance between the origin of the first to third exciting coils 13X to 13Z arranged at the first position $P_1$ on the triaxial coordinate system and the origin of the first to third detecting coils 15X to 15Z arranged at the second position $P_2$ on the triaxial coordinate system. In this case, reference symbol $E_0$ denotes the square root of ($Ex^2 + Ey^2 + Rz^2$) where $Ex^2$, $Ey^2$, and $Ez^2$ correspond to the equations (5) to (7), respectively. Further, reference symbol $r_1$ denotes a distance between the origin of the first to third exciting coils 13X to 13Z arranged at the first position $P_1$ on the triaxial coordinate system and the origin of the first to third detecting coils 15X to 15Z arranged at the third position $P_3$ on the triaxial coordinate system. In this case, when reference symbol $E_1$ denotes the square root of ($Ex_1^2 + Ey_1^2 + Ez_1^2$) where $Ex_1^2$, $Ey_1^2$, and $Ez_1^2$ correspond to the equations (5) to (7), respectively, the following relation is obtained.

$$E_0/E_1^3/r_0^3 \quad (14)$$

The equation (14) is solved for the distance $r_1$ as follows.

$$r_1 = \{(E_0/E_1)^{1/3} \cdot \} r_0 \quad (15)$$

As mentioned above, by measuring the voltages $Eu_1$ to $Eu_3$, $Ev_1$ to $Ev_3$, and $Ew_1$ to $Ew_3$ induced in the first to third detecting coils 15X to 15Z and calculating the square root of ($Ex_1^2 + Ey_1^2 + Ez_1^2$), based on the calculation of the equation (15), the distance $r_1$ from the first position $P_1$ to the third position $P_3$ can be determined. That is, the distance $r_1$ from the first position $P_1$ to the third position $P_3$ can be determined, irrespective of the directions of the first to third exciting coils 13X to 13Z and the first to third detecting coils 15X to 15Z. Since the coordinate positions of the first and second positions $P_1$ and $P_2$ are known, the coordinate position of the third position $P_3$ can be determined by calculating the azimuth and the distance from the first position $P_1$ to the third position $P_3$. Incidentally, in this case, the azimuth can be calculated based on the principle described in FIG. 2. Obviously, if correction is performed in advance by using the voltage data $E_0$ regarding the distance $r_0$, any desired position can be measured.

Although it is assumed in the above description that different apparatuses executes the calculations by using the voltage values measured by the voltmeter 18. Instead of the voltmeter 18, the calculation processing unit 19 having an A/D converting function for converting an analog signal into a digital signal may be connected to an output terminal of the detection circuit 17. In this case, the calculation processing unit 19 stores therein a processing program for implementing the above calculations. Under the processing program, the nine voltage-values which are obtained by the detection circuit 17 via the second switching circuit 16 are sequentially sampled and calculated in the above manner. Consequently, the distance $r_1$ from the first position $P_1$ to the third position $P_3$ and the coordinate position of the third position $P_3$ are obtained.

As mentioned before, the first and second switching circuits 14 and 16 may be switched manually or automatically. For instance, reference symbol t denotes a time for connecting one of the first to third exciting coils 13X to 13Z to the first switching circuit 14. Then, preferably, a time for connecting one of the first to third detecting coils 15X to 15Z to the second switching circuit 16 is t/3.

Figure 8:
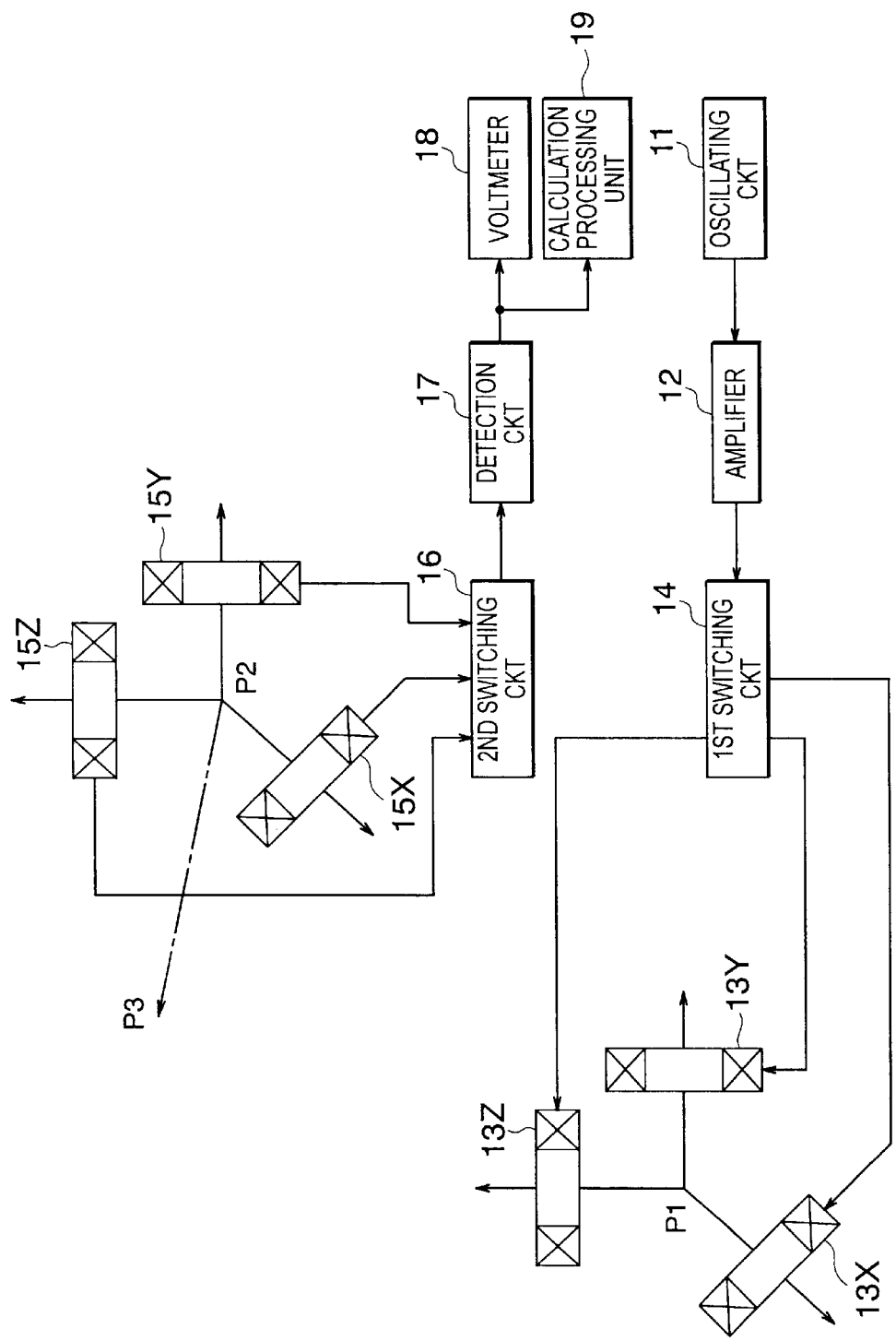
FIG. 8 is a diagram showing the structure of a position measuring apparatus according to a first embodiment of the present invention.
Figure 9:
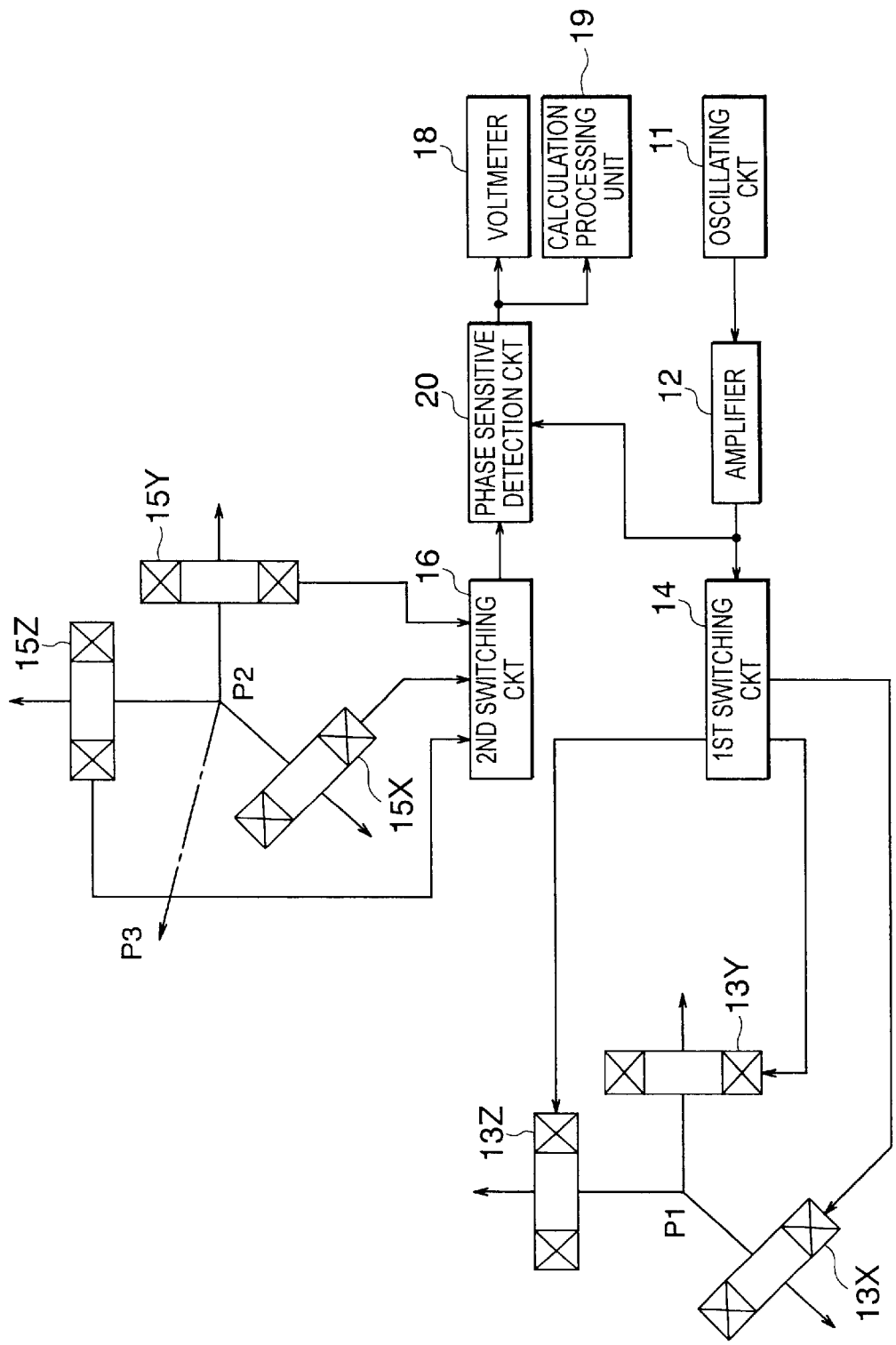
FIG. 9 is a diagram showing a modification of the structure of the position measuring apparatus shown in FIG. 8.

FIG. 9 shows a diagram showing a modification of the structure of the position measuring apparatus shown in FIG. 8 according to the first embodiment, and the same portions as those in FIG. 8 are designated by the same reference numbers. In place of the detection circuit 17 in FIG. 8, the modification uses a phase sensitive detection circuit 20 for setting the output signal of the amplifier 12 as a detected signal. Even when an S/N ratio is decreased, an effect to remove noise components mixed in frequency components of the first to third detecting coils 15X to 15Z can be exhibited by using the phase sensitive detection circuit 20.

Figure 10:
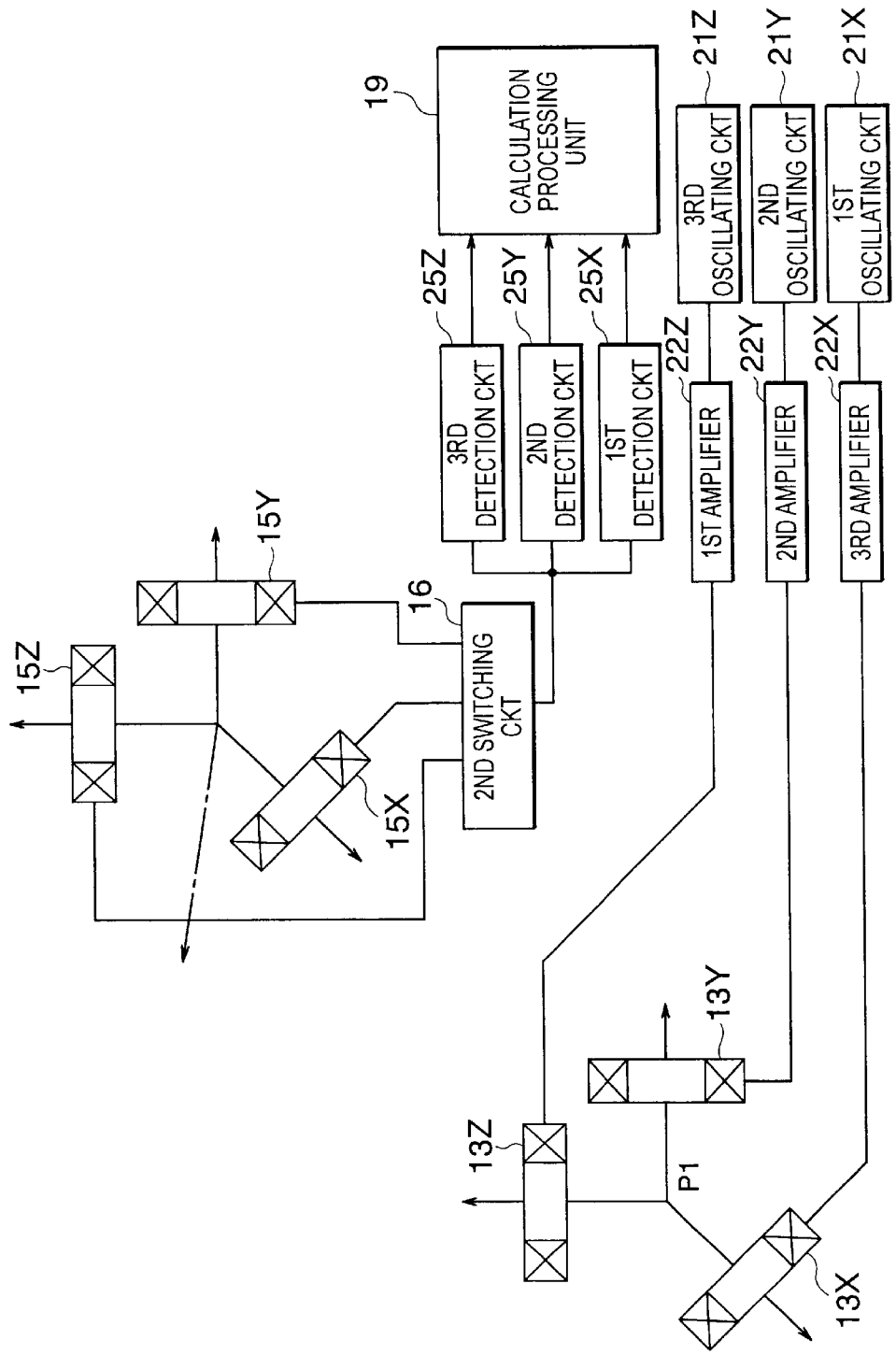
FIG. 10 is a diagram showing a position measuring apparatus according to a second embodiment of the present invention.

Hereinbelow, a description is given to a position measuring apparatus according to a second embodiment of the present invention with reference to FIG. 10. In the second embodiment, the first switching circuit 14 in FIG. 8 is omitted. A first amplifier 22X amplifies an AC signal of a first frequency $f_1$ transmitted from the first oscillating circuit 21X and supplies an amplified signal to the first exciting coil 13X. Similarly, second and third amplifiers 22Y and 22Z amplify AC signals of second and third frequencies $f_2$ and $f_3$ transmitted from the second and third oscillating circuits 21Y and 21Z and supply amplified signals to the second and third exciting coils 13Y and 13Z, respectively.

In other words, after the first to third amplifiers 22X to 22Z amplify the AC signals of the first to third frequencies $f_1$ to $f_3$, the first to third exciting coils 13X to 13Z arranged to three perpendicular axes of a triaxial coordinate system at the first position $P_1$ are simultaneously excited with the mutual relationship of an angle of 90°.

On the contrary, first to third detection circuits 25X to 25Z for detecting first to third frequencies $f_1$ to $f_3$ are connected, via the second switching circuit 16, to the first to third detecting coils 15X to 15Z arranged to three perpendicular axes of a triaxial coordinate system at the second position $P_2$.

Consequently, when the first to third exciting coils 13X to 13Z are simultaneously excited by the AC signals of the first to third frequencies $f_1$ to $f_3$, the first to third detection circuits 25X to 25Z measure voltages of the first to third frequencies $f_1$ to $f_3$ by using the voltage induced in the first detecting coil 15X of the first to third detecting coils 15X to 15Z. These voltages correspond to the voltages $Eu_1$, $Ev_1$, and $Ew_1$ described in FIG. 8. Next, the second switching circuit 16 switches the first detecting coil 15X to the second detecting coil 15Y and the first to third detection circuits 25X to 25Z measure voltages of the first to third frequencies $f_1$ to $f_3$ by using the voltage induced in the second detecting coil 15Y. These voltages correspond to the voltages $Eu_2$, $Ev_2$, and $Ew_2$ described in FIG. 8. Further, the second switching circuit 16 switches the second detecting coil 15Y to the third detection circuit 15Z and the first to third detection circuits 25X to 25Z measure voltages of the first to third frequencies $f_1$ to $f_3$ by using the voltage induced in the third detecting coil 15Z. These voltages correspond to the voltages $Eu_3$, $Ev_3$, and $Ew_3$ described in FIG. 8.

Thereafter, when the first to third detecting coils 15X to 15Z are moved at the third position $P_3$, eighteen voltage data are obtained by measuring the voltages in the above manner total six times. Since the first and second positions $P_1$ and $P_2$ are known and a distance from the first position $P_1$ to the third position $P_3$ and an azimuth therefrom are determined. Further, the coordinate position of the third position $P_3$ is determined.

Figure 11:
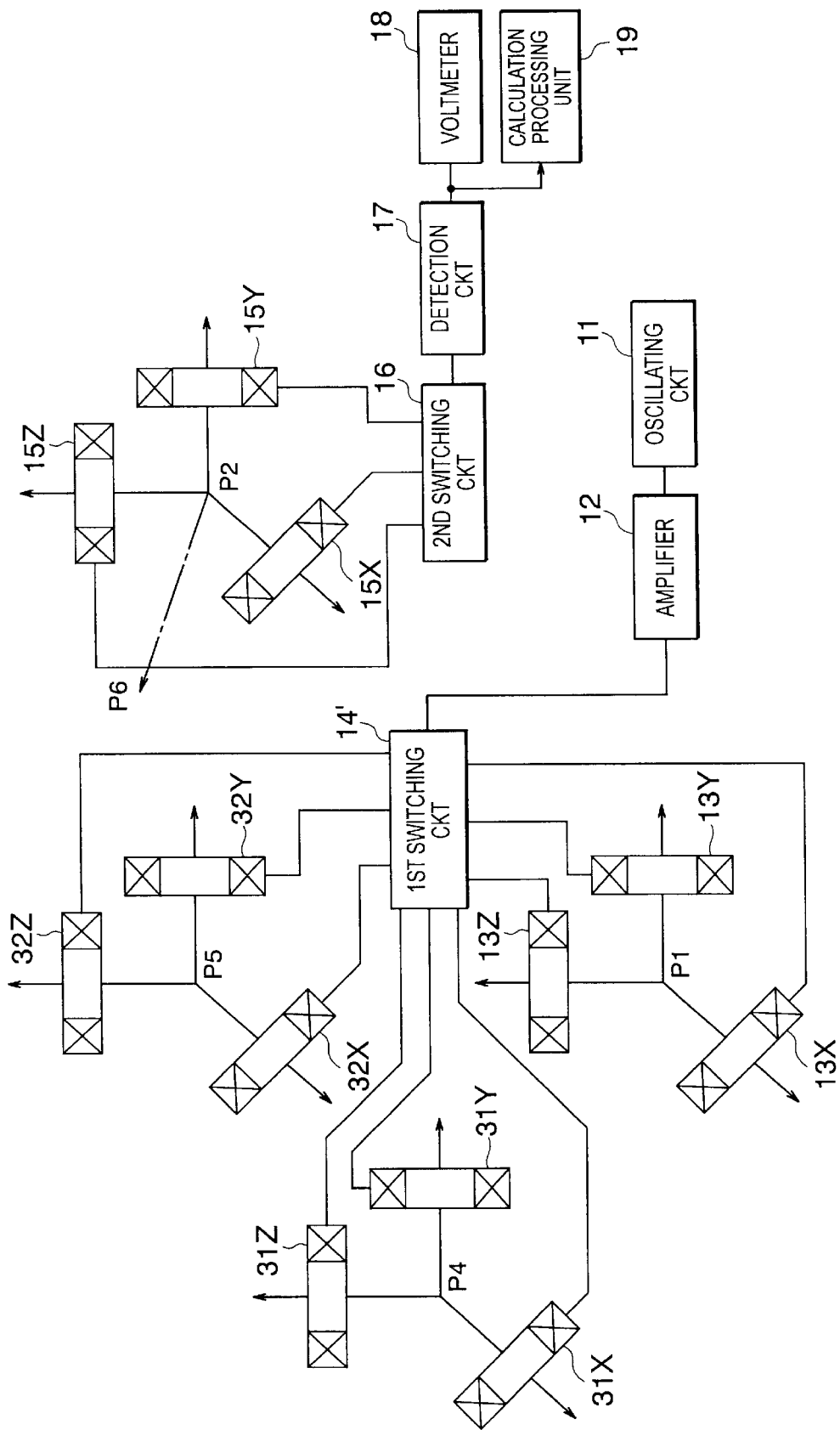
FIG. 11 is a diagram showing a position measuring apparatus according to a third embodiment of the present invention.

Hereinbelow, a description is given to a position measuring apparatus according to a third embodiment of the present invention with reference to FIG. 11. According to the third embodiment, in addition to the structure in FIG. 8 according to the first embodiment, a set of fourth to sixth exciting coils 31X to 31Z and a set of seventh to ninth exciting coils 32X to 32Z are provided. The fourth to sixth exciting coils 31X to 31Z are arranged to perpendicular X-, Y-, and Z-axes of a triaxial coordinate system and are set at a fourth position $P_4$. The seventh to ninth exciting coils 32X to 32Z are arranged to perpendicular X-, Y-, and Z-axes of a triaxial coordinate system and are set at a fifth position $P_5$.

According to the third embodiment, after the amplifier 12 amplifies the output of the oscillating circuit 11, a first switching circuit 14' sequentially switches the first to third exciting coils 13X to 13Z arranged at the first position $P_1$, thus generating magnetic fields with the mutual relationship of an angle of 90°. When the first exciting coil 13X is excited, the second switching circuit 16 sequentially switches the first to third detecting coils 15X to 15Z arranged at the second position $P_2$, and the voltmeter 18 measures voltages induced in the first to third detecting coils 15X to 15Z.

Next, when the second exciting coil 13Y is excited, the second switching circuit 16 sequentially switches the first to third detecting coils 15X to 15Z, the voltmeter 18 measures voltages induced in the first to third detecting coils 15X to 15Z.

Further, when the third exciting coil 13Z is excited, the second switching circuit 16 sequentially switches the first to third detecting coils 15X to 15Z and the voltmeter 18 measures voltages induced in the first to third detecting coils 15X to 15Y.

The first switching circuit 14' sequentially switches the fourth to sixth exciting coils 31X to 31Z arranged at the fourth position $P_4$, thus generating magnetic fields with the mutual relationship of an angle of 90°. When the fourth exciting coil 31X is excited, the second switching circuit 16 sequentially switches the first to third detecting coils 15X to 15Z, and voltages induced in the first to third detecting coils 15X to 15Z are measured. Next, when the fifth exciting coil 31Y is excited, the second switching circuit 16 sequentially switches the first to third detecting coils 15X to 15Z, and voltages induced in the first to third detecting coils 15X to 15Z are measured. When the sixth exciting coil 31Z is excited, the second switching circuit 16 sequentially switches the first to third detecting coils 15X to 15Z, and voltages induced in the first to third detecting coils 15X to 15Z are measured.

The first switching circuit 14' sequentially switches the seventh to ninth exciting coils 32X to 32Z arranged at the fifth position $P_5$, thus generating magnetic fields with the mutual relationship of an angle of 90°. When the seventh exciting coil 32X is excited, the second switching circuit 16 sequentially switches the first to third detecting coils 15X to 15Z, and voltages induced in the first to third detecting coils 15X to 15Z are measured. When the eighth exciting coil 32Y is excited, the second switching circuit 16 sequentially switches the first to third detecting coils 15X to 15Z, and voltages induced in the first to third detecting coils 15X to 15Z are measured. When the ninth exciting coil 32Z is excited, the second switching circuit 16 sequentially switches the first to third detecting coils 15X to 15Z, and voltages induced in the first to third detecting coils 15X to 15Z are measured.

As a result of the above measurement, twenty-seven voltage data are obtained.

Thereafter, when the first to third detecting coils 15X to 15Z are moved at a sixth unknown position (hereinafter, referred to a sixth position) $P_6$, fifty-four voltage data are obtained by measuring the voltages in the above manner total fifty-four times. Since the first, second, fourth, and fifth positions $P_1$, $P_2$, $P_4$, and $P_5$ are known, a distance from the first position $P_1$ to the sixth position $P_6$, a distance from the fourth position $P_4$ to the sixth position $P_6$, and a distance from the fifth position $P_5$ to the sixth position $P_6$ are calculated, thereby determining coordinate position of the sixth position $P_6$ in the three-dimensional space, irrespective of the directions of the exciting coils and the detecting coils.

Figure 12:
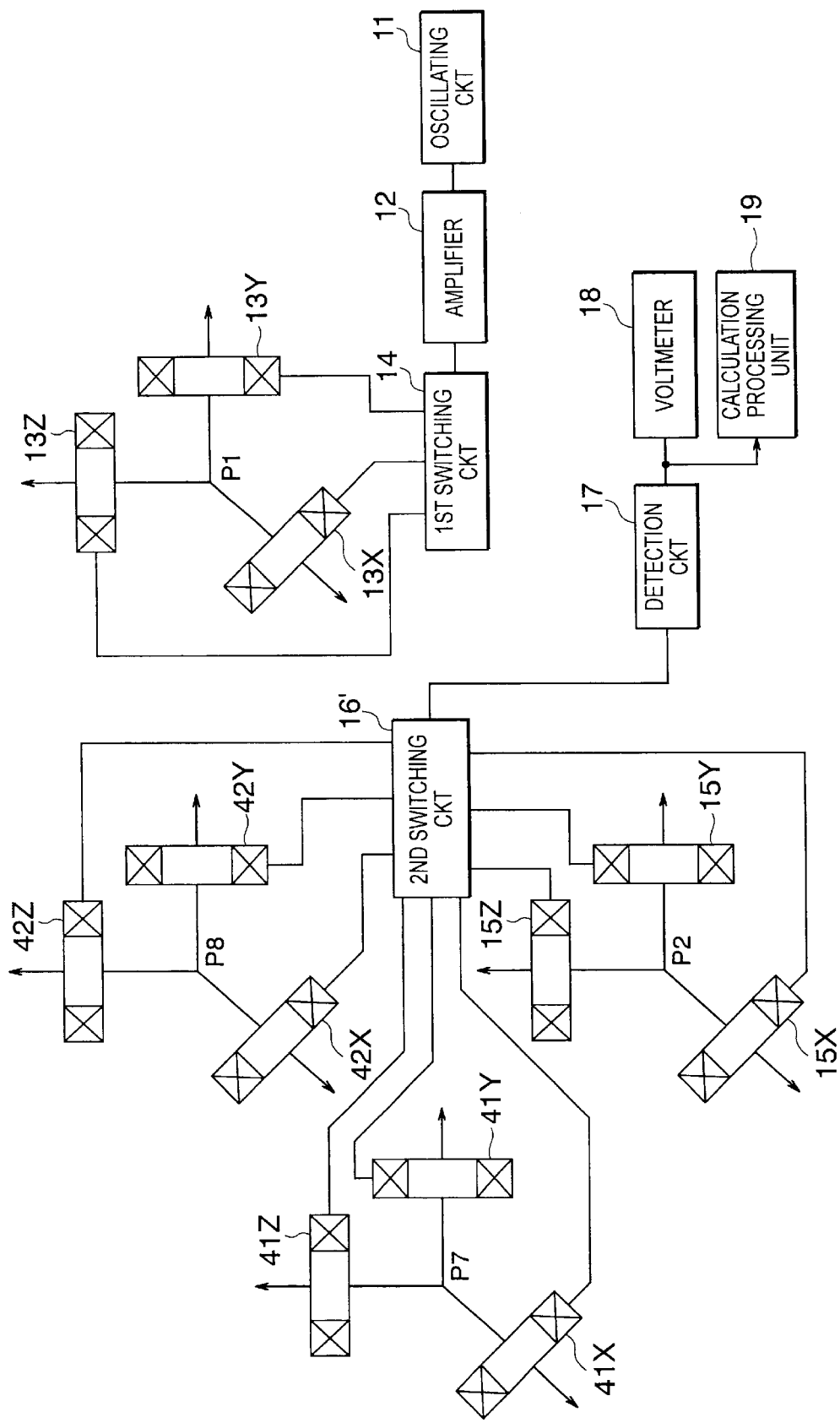
FIG. 12 is a diagram showing a position measuring apparatus according to a fourth embodiment of the present invention.

Hereinbelow, a description is given to a position measuring apparatus according to a fourth embodiment of the present invention with reference to FIG. 12. According to the fourth embodiment, the number of the detecting coils in FIG. 8 according to the first embodiment is increased. That is, similarly to the first embodiment, a set of first to third exciting coils 13X to 13Z is arranged at the first position $P_1$, and a set of the first to third detecting coils 15X to 15Z is arranged at the second position $P_2$. According to the fourth embodiment, further, fourth to sixth detecting coils 41X to 41Z arranged on perpendicular X-, Y-, and Z-axes on a triaxial coordinate system are set at a seventh position $P_7$. Furthermore, seventh to ninth detecting coils 42X to 42Z arranged to perpendicular X-, Y-, and Z-axes on a triaxial coordinate system are set at an eighth position $P_8$. A second switching circuit 16' switches operations for extracting voltages transmitted from the first to third detecting coils 15X to 15Z, 41X to 41Z, and 42X to 42Z. Preferably, the set of first to third detecting coils 15X to 15Z, the set of the fourth to sixth detecting coils 41X to 41Z, and the set of the seventh to ninth detecting coils 42X to 42Z are spaced, respectively, because the displacement is detected at the respective second position $P_2$, seventh position $P_7$, and eighth position $P_8$ which are distant from each other.

After the amplifier 12 amplifies the output of the oscillating circuit 11, the first switching circuit 14 sequentially switches the first to third exciting coils 13X to 13Z arranged at the first position $P_1$, thus generating magnetic fields with the mutual relationship of an angle of 90°.

To start with, when the first exciting coil 13X is excited, the second switching circuit 16' sequentially switches the first to third detecting coils 15X to 15Z at the second position $P_2$, and the voltmeter 18 measures voltages induced in the first to third detecting coils 15X to 15Z via the detection circuit 17. Next, the second switching circuit 16' sequentially switches the fourth to sixth detecting coils 41X to 41Z at the seventh position $P_7$, and voltages induced in the fourth to sixth detecting coils 41X to 41Z are measured. Further, the second switching circuit 16' sequentially switches the seventh to ninth detecting coils 42X to 42Z at the eighth position $P_8$, and voltages induced in the seventh to ninth detecting coils 42X to 42Z are measured.

When the second exciting coil 13Y is excited, the second switching circuit 16' sequentially switches the first to third detecting coils 15X to 15Z at the second position $P_2$, and voltages induced in the first to third detecting coils 15X to 15Z are measured. Next, the second switching circuit 16' sequentially switches the fourth to sixth detecting coils 41X to 41Z at the seventh position $P_7$, and voltages induced in the fourth to sixth detecting coils 41X to 41Z are measured. Further, the second switching circuit 16' sequentially switches the seventh to ninth detecting coils 42X to 42Z at the eighth position $P_8$, and voltages induced in the seventh to ninth detecting coils 42X to 42Z are measured.

When the third exciting coil 13Z is excited, the second switching circuit 16' sequentially switches the first to third detecting coils 15X to 15Z at the second position $P_2$, and voltages induced in the first to third detecting coils 15X to 15Z are measured. Next, the second switching circuit 16' sequentially switches the fourth to sixth detecting coils 41X to 41Z at the seventh position $P_7$, and voltages induced in the fourth to sixth detecting coils 41X to 41Z are measured. Further, the second switching circuit 16' sequentially switches the seventh to ninth detecting coils 42X to 42Z at the eighth position $P_8$, and voltages induced in the seventh to ninth detecting coils 42X to 42Z are measured.

Thereafter, when at least one of the sets of the detecting coils 15X to 15Z, 41X to 41Z, 42X to 42Z is moved at a ninth position $P_9$, fifty-four voltage data are obtained by measuring the voltages in the above manner total fifty-four times. Since the first, second, seventh, and eighth positions $P_1$, $P_2$, $P_7$, and $P_8$ are known, a distance from the first position $P_1$ to the ninth position $P_9$, a distance from the second position $P_2$ to the ninth position $P_9$, a distance from the seventh position $P_7$ to the ninth position $P_9$, and a distance from the eighth position $P_8$ to the ninth position $P_9$ are calculated, thereby determining coordinate position of the ninth position $P_9$ in the three-dimensional space, irrespective of the directions of the first to third exciting coils 13X to 13Z and the first to ninth detecting coils 15X to 15Z, 41X to 41Z, and 42X to 42Z.

Incidentally, when the above position measuring apparatus is applied as an apparatus for measuring the displacement in underground or at the bed in underwater in the description of the conventional art, it cannot be known when the displacement occurs. Therefore, preferably, the operation for measuring the voltages is periodically performed while a time interval is arbitrarily determined.

As mentioned above, according to the position measuring apparatus of the present invention, the distance and the azimuth of the measuring subject position at which the detecting coils are arranged, from the reference position at which the exciting coils are arranged, are determined in the three-dimensional space and, thereby, the measuring subject position can be determined on the three-dimensional space. When the frequency of the oscillating circuit belongs to the audible band, the electromagnetic waves generated by the exciting coils mainly include magnetic field components. Therefore, a smaller amount of the electromagnetic waves is attenuated in underground and underwater, as compared with high-frequency-band electromagnetic waves which mainly including electric field components and the position on the coordinate system can be determined even in underground and underwater. Since the outputs of the detecting coils arranged at the measuring subject position indicate the strength of the magnetic field, no rotation of the detecting system itself affects the measured results. The values of $Ex_2$, $Ey_2$, and $Ez_2$ are equal to values obtained by adding effective values of Eu, Ev, and Ew to the second power, where $Ex_2$, $Ey_2$, $Ez_2$ are substituted for the equations for determining the angles $\theta_1$, $\theta_2$, and $\theta_3$ regarding the X-, Y-, and Z- axes and for the equations for obtaining the distance to the measuring subject position from the reference position and they become DC voltages, and Eu, Ev, and Ew are measured voltages generated in the detecting coils. Therefore, it is advantageous for the analog and digital processes. Further, since the measured voltage to the second power is obtained when the synchronous detection is used with reference to the exciting current and, then, the effect to remove noises is increased, it is advantageous for the signal characteristics against the noises and the obtained effect is increased.

What is claimed is:

1. An azimuth measuring method comprising the steps of:

arranging first to third exciting coils, at a reference position which is predetermined, so that central axes thereof match three perpendicular axes of a triaxial coordinate system;

arranging first to third detecting coils at a measuring subject position distant from the reference position so that central axes thereof match three perpendicular axes of a triaxial coordinate system;

sequentially measuring voltages induced in said first to third detecting coils when said first exciting coil is excited;

sequentially measuring voltages induced in said first to third detecting coils when said second exciting coil is excited;

sequentially measuring voltages induced in said first to third detecting coils when said third exciting coil is excited; and determining an azimuth of the measuring subject position from the reference position based on a predetermined calculation by using all nine induced-voltages which are obtained by said first to third detecting coils.

2. An azimuth measuring method comprising the steps of:

arranging first to third exciting coils, at a first reference position which is predetermined, so that central axes thereof match three perpendicular axes of a first triaxial coordinate system;

arranging fourth to sixth exciting coils at a second reference position distant from the first reference position by a predetermined distance so that central axes thereof match three perpendicular axes of a second triaxial coordinate system, said three perpendicular axes of the second triaxial coordinate system being parallel to the three perpendicular axes, corresponding to thereto, of the first triaxial coordinate system;

arranging first to third detecting coils at a measuring subject position distant from the first and second reference positions so that central axes thereof match three perpendicular axes of a triaxial coordinate system;

sequentially measuring voltages induced in said first to third detecting coils when said first exciting coil is excited;

sequentially measuring voltages induced in said first to third detecting coils when said second exciting coil is excited;

sequentially measuring voltages induced in said first to third detecting coils when said third exciting coil is excited;

sequentially measuring voltages induced in said first to third detecting coils when said fourth exciting coil is excited;

sequentially measuring voltages induced in said first to third detecting coils when said fifth exciting coil is excited;

sequentially measuring voltages induced in said first to third detecting coils when said sixth exciting coil is excited; and determining a first azimuth of the measuring subject position from the first reference position and determining a second azimuth of the measuring subject position from the second reference position based on a predetermined calculation by using all eighteen induced-voltages which are obtained by said first to third detecting coils, and determining a coordinate position of the measuring subject position by using the first and second azimuths and the said predetermined distance.

3. An azimuth measuring apparatus comprising:

a signal generating circuit for outputting an AC signal;

first to third exciting coils arranged, at a reference position which is predetermined, so that central axes thereof match three perpendicular axes of a triaxial coordinate system;

a first switching circuit for sequentially exciting said first to third exciting coils in response to an output of said signal generating circuit;

first to third detecting coils arranged at a measuring subject position distant from the reference position so that central axes thereof match three perpendicular axes of a triaxial coordinate system;

a second switching circuit for sequentially extracting outputs of said first to third exciting coils; and a voltage extracting circuit for obtaining a voltage signal from the output extracted by said second switching circuit, wherein voltages induced in said first to third detecting coils are sequentially extracted when said first exciting coil is excited, voltages induced in said first to third detecting coils are sequentially extracted when said second exciting coil is excited, voltages induced in said first to third detecting coils are sequentially extracted when said third exciting coil is excited, and an azimuth of the measuring subject position from the reference position is determined based on a predetermined calculation by using all nine induced-voltages which are obtained by said first to third detecting coils.

4. An apparatus according to claim 3, wherein said signal generating circuit comprises an oscillating circuit and an amplifier for amplifying an output of said oscillating circuit, and said voltage extracting circuit comprises a detection circuit for detecting outputs, of said first to third detecting coils, which are extracted via said second switching circuit.

5. An apparatus according to claim 4, wherein said detection circuit uses a phase sensitive detection circuit for synchronously detecting an output of said amplifier as a detected signal.

6. An apparatus according to claim 3, wherein when symbols $Eu_1$, $Ev_1$, and $Ew_1$ designate the voltages induced in said first to third exciting coils upon exciting said first exciting coil, symbols $Eu_2$, $Ev_2$, and $Ew_2$ designate the voltages induced in said first to third exciting coils upon exciting said second exciting coil, symbols $Eu_3$, $Ev_3$, and $Ew_3$ designate the voltages induced in said first to third exciting coils upon exciting said third exciting coil is excited, $Ex^2$, $Ey^2$, and $Ez^2$ are defined by equations of $$Ex^2 = (Eu_1^2 + Ev_1^2 + Ew_1^2),$$

$$Ey^2 = (Eu_2^2 + Ev_2^2 + Ew_2^2),\text{ and}$$

$$Ez^2 = (Eu_3^2 + Ev_3^2 + Ew_3^2),$$

when $\theta_1$, $\theta_2$, and $\theta_3$ designate angles formed by the reference position and X-, Y- and Z-axes of the reference position, the angles $\theta_1$, $\theta_2$, and $\theta_3$ are expressed by equations of $$\theta_1 = \cos^{-1}\{[1/(3)^{1/2}]\cdot[6Ex^2/(Ex^2+Ey^2+Ez^2)-1]^{1/2}\},$$

$$\theta_2 = \cos^{-1}\{[1/(3)^{1/2}]\cdot[6Ey^2/(Ex^2+Ey^2+Ez^2)-1]^{1/2}\},\text{ and}$$

$$\theta_3 = \cos^{-1}\{[1/(3)^{1/2}]\cdot[6Ez^2/(Ex^2+Ey^2+Ez^2)-1]_{1/2}\},\text{ and}$$

the azimuth of the measuring subject position from the reference position is determined based on calculations of the equations.

7. An azimuth measuring apparatus comprising:

a signal generating circuit for outputting an AC signal;

first to third exciting coils arranged, at a first reference position which is predetermined, so that central axes thereof match three perpendicular axes of a first triaxial coordinate system;

fourth to sixth exciting coil arranged at a second reference position distant from the first reference position by a predetermined distance so that central axes thereof match three perpendicular axes of a second triaxial coordinate system, said three perpendicular axes of the second triaxial coordinate system being parallel to, corresponding thereto, the three axes of the first triaxial coordinate system;

a first switching circuit for sequentially exciting said first to sixth exciting coils in response to an output of the signal generating circuit;

first to third detecting coils arranged at a measuring subject position distant from the first and second reference positions so that central axes thereof match three perpendicular axes of a triaxial coordinate system;

a second switching circuit for sequentially extracting outputs of said first to third exciting coils; and a voltage extracting circuit for obtaining a voltage signal from the outputs extracted by said second switching circuit, wherein voltages induced in said first to third detecting coils are sequentially extracted when said first exciting coil is excited, voltages induced in said first to third detecting coils are sequentially extracted when said second exciting coil is excited, voltages induced in said first to third detecting coils are sequentially extracted when said third exciting coil is excited, voltages induced in said first to third detecting coils are sequentially extracted when said fourth exciting coil is excited, voltages induced in said first to third detecting coils are sequentially extracted when said fifth exciting coil is excited, voltages induced in said first to third detecting coils are sequentially extracted when said sixth exciting coil is excited, and a first azimuth of the measuring subject position from the first reference position is determined and a second azimuth of the measuring subject position from the second reference position is determined, based on a predetermined calculation by using all eighteen induced-voltages which are obtained by said first to third detecting coils, and a coordinate position of the measuring subject position are determined by using the first and second azimuths and the predetermined distance.

8. An apparatus according to claim 7, wherein a triaxial coordinate system of the first reference position is formed by X-, Y-, and Z-axes, and a triaxial coordinate system of the second reference position is formed by X'-, Y'-, and Z'-axes, angles $\theta_1$, $\theta_2$, and $\theta_3$ formed by the first reference position and the X-, Y-, and Z-axes are determined based on a calculation by using all nine induced-voltages, associated with said first to third exciting coils, which are obtained by said first to third detecting coils, angles $\theta_1'$, $\theta_2'$, and $\theta_3'$ formed by the second reference position and the X'-, Y'-, and Z'-axes are determined based on a calculation by using all nine induced-voltages, associated with said fourth to sixth exciting coils, which are obtained by said first to third detecting coils, and the coordinate position of the measuring subject position is determined by using the coordinate positions of the first and second reference positions and all three angles including at least one of the angles $\theta_1$, $\theta_2$, and $\theta_3$ regarding the first reference position and at least one of the angles $\theta_1'$, $\theta_2'$, and $\theta_3'$ regarding the second reference position.

9. An azimuth measuring apparatus comprising:

first to third exciting coils arranged at a reference position which is predetermined, for generating magnetic fields perpendicular to each other;

a signal generating circuit for sequentially supplying AC signals to said first to third exciting coils and exciting them;

first to third detecting coils arranged, at a measuring subject position distant from the reference position, so that central axes thereof match three perpendicular axes of a triaxial coordinate system;

an output switching circuit for sequentially extracting outputs of said first to third detecting coils; and a voltage extracting circuit for obtaining a voltage signal from outputs extracted by said output switching circuit, wherein voltages induced in said first to third detecting coils are sequentially extracted when said first exciting coil is excited, voltages induced in said first to third detecting coils are sequentially extracted when said second exciting coil is excited, voltages induced in said first to third detecting coils are sequentially extracted when said third exciting coil is excited, and an azimuth of the measuring subject position from the reference position is determined based on a predetermined calculation by using all nine induced-voltages which are obtained by said first to third detecting coils, wherein an output from one of said first to third exciting coils is set as a reference output of one exciting coil, in order to generate AC magnetic fields perpendicular to each other, when exciting one of the two remaining exciting coils excluding said one exciting coil, said signal generating circuit applies a compensating voltage to said one exciting coil and the other remaining exciting coil of the two remaining exciting coils excluding said one exciting coil so that a magnetic field output of the one remaining exciting coil is perpendicular to that of said one exciting coil, and when exciting the other remaining exciting coil of the two remaining exciting coils excluding said one exciting coil, said signal generating circuit applies a compensating voltage to said one exciting coil and the one remaining exciting coil of the two remaining exciting coils excluding said one exciting coil so that a magnetic field output of the other remaining exciting coil is perpendicular to magnetic field outputs of said one exciting coil and the one remaining exciting coil.

10. An apparatus according to claim 9, wherein said signal generating circuit comprises:

an oscillating circuit;

first to third variable output amplifiers for amplifying an output of said oscillating circuit;

first to third switching circuit connected to output sides of said first to third variable output amplifiers, for supplying outputs of said first to third variable output amplifiers to said first to third exciting coils; and a control circuit for controlling the outputs of said first to third variable output amplifiers so as to set them to be at an output level for exciting said first to third exciting coils or at an output level, for the compensating voltage, sufficiently lower than the output level for exciting said first to third exciting coils, and for controlling a switching operation of said first to third switching circuits.

11. An azimuth measuring apparatus comprising:

first to third exciting coils arranged at a reference position which is predetermined, for generating perpendicular magnetic fields;

a signal generating circuit for sequentially supplying AC signals to said first to third exciting coils and exciting them;

first to third detecting coils arranged, at a measuring subject position distant from the reference position, so that central axes thereof match three perpendicular axes of a triaxial coordinate system;

an output switching circuit for sequentially extracting outputs of said first to third detecting coils; and a voltage extracting circuit for obtaining a voltage signal from outputs extracted by said output switching circuit, wherein voltages induced in said first to third detecting coils are sequentially extracted when said first exciting coil is excited, voltages induced in said first to third detecting coils are sequentially extracted when said second exciting coil is excited, voltages induced in said first to third detecting coils are sequentially extracted when said third exciting coil is excited, and an azimuth of the measuring subject position from the reference position is determined based on a predetermined calculation by using all nine induced-voltages which are obtained by said first to third detecting coils, wherein said azimuth measuring apparatus further comprises first to third compensating coils which are wound to the central axes of said first to third exciting coils, respectively, an output from one of said first to third exciting coils is set as a reference output of one exciting coil, in order to generate AC magnetic fields perpendicular to each other, when exciting one of the two remaining exciting coils excluding said one exciting coil, said signal generating circuit applies a compensating voltage to one of said first to third compensating coils corresponding to said one exciting coil and one of the two remaining compensating coils, excluding said one compensating coil, corresponding to the other remaining exciting coil of the two remaining exciting coils excluding said one exciting coil, so that a magnetic field output of the one remaining exciting coil is perpendicular to that of said one exciting coil, and when exciting the other remaining exciting coil of the two remaining exciting coils excluding said one exciting coil, said signal generating circuit applies a compensating voltage to one of said first to third compensating coils, corresponding to said one exciting coil, and one of the two remaining compensating coils, excluding said one compensating coil, corresponding to the one remaining exciting coil of the two remaining exciting coils excluding said one exciting coil, so that a magnetic field output of the other remaining exciting coil is perpendicular to those of said one exciting coil and the one remaining exciting coil.

12. An apparatus according to claim 11, wherein said signal generating circuit comprises:

an oscillating circuit;

first to third variable output amplifiers for amplifying an output of said oscillating circuit;

first to third switching circuit connected to output sides of said first to third variable output amplifiers, for switching and supplying outputs of said first to third variable output amplifiers to said first to third exciting coils or said first to third compensating coils; and a control circuit for controlling the outputs of said first to third variable output amplifiers so as to set them to be at an output level for exciting said first to third exciting coils or at an output level, for said compensating voltage, sufficiently lower than said output level for exciting said first to third exciting coils, and for controlling a switching operation of said first to third switching circuits.

13. A position measuring method comprising the steps of:

arranging a set of first to third exciting coils arranged at three perpendicular axes of a triaxial coordinate system at a first position;

arranging a set of first to third detecting coils arranged at three perpendicular axes of a triaxial coordinate system at a second position distant from the first position by a predetermined distance $r_0$;

sequentially measuring voltages $Eu_1$, $Ev_1$, and $Ew_1$ which are induced in the first to third detecting coils when said first exciting coils is excited;

sequentially measuring voltages $Eu_2$, $Ev_2$, and $Ew_2$ which are induced in said first to third detecting coils when said second exciting coils is excited;

sequentially measuring voltages $Eu_3$, $Ev_3$, and $Ew_3$ which are induced in said first to third detecting coils when said third exciting coils is excited;

defining $Ex^2$, $Ey^2$, and $Ez^2$ as sums of squares of the voltages $Eu_1$ to $Eu_3$, $Ev_1$ to $Ev_3$, and $Ew_1$ to $Ew_3$ by equations of $Ex^2=(Eu_1^2+Ev_1^2+Ew_1^2)$, $Ey^2=(Eu_2^2+Ev_2^2+Ew_2^2)$, and $Ez^2=(Eu_3^2+Ev_3^2+Ew_3^2)$;

calculating a square root $E_0$ of $(Ex_0^2+Ey_0^2+Ez_0^2)$ corresponding to $Ex^2$, $Ey^2$, and $Ez^2$ as the sums of squares of the voltages $Eu_1$ to $Eu_3$, $Ev_1$ to $Ev_3$, and $Ew_1$ to $Ew_3$, when the set of said first to third exciting coils is arranged at the first position and the set of said first to third detecting coils is arranged at the second position, by using an equation of $E_0=(Ex_0^2+Ey_0^2+Ez_0^2)^{1/2}$;

setting a distance $r_1$ from the set of said first to third exciting coils to the set of said first to third exciting coils and calculating a square root $E_1$ of $(Ex_1^2+Ey_1^2+Ez_1^2)$ corresponding to $Ex^2$, $Ey^2$, and $Ez^2$ as the sums of squares of the voltages $Eu_1$ to $Eu_3$, $Ev_1$ to $Ev_3$, and $Ew_1$ to $Ew_3$, when the set of said first to third detecting coils are moved at a third position, by using an equation of $E_1=(Ex_1^2+Ey_1^2+Ez_1^2)^{1/2}$; and calculating the distance $r_1$, irrespective of directions of said first to third exciting coils and directions of said first to third exciting coils, by using an equation of $r_1=\{(E_0/E_1)^{1/3}\} \cdot r_0$.

14. A position measuring apparatus comprising:

a signal generating circuit for outputting an AC signal;

a set of first to third exciting coils arranged at three perpendicular axes of a triaxial coordinate system and at a first position;

a first switching circuit for sequentially exciting said first to third exciting coils in response to the output of said signal generating circuit;

first to third detecting coils arranged at three perpendicular axes of a triaxial coordinate system at a second position distant from the first position by a predetermined distance $r_0$;

a second switching circuit for sequentially extracting outputs of said first to third exciting coils; and a voltage extracting circuit for obtaining a voltage signal from the output extracted by said second switching circuit, wherein voltages $Eu_1$, $Ev_1$, and $Ew_1$ which are induced in said first to third detecting coils are sequentially measured when said first exciting coils is excited, voltages $Eu_2$, $Ev_2$, and $Ew_2$ which are induced in said first to third detecting coils are sequentially measured when said second exciting coils is excited, voltages $Eu_3$, $Ev_3$, and $Ew_3$ which are induced in said first to third detecting coils are sequentially measured when said third exciting coils is excited, $Ex^2$, $Ey^2$, and $Ez^2$ as sums of squares of the voltages $Eu_1$ to $Eu_3$, $Ev_1$ to $Ev_3$, and $Ew_1$ to $Ew_3$, by equations of $Ex^2=(Eu_1^2+Ev_1^2+Ew_1^2)$, $Ey^2=(Eu_2^2+Ev_2^2+Ew_2^2)$, and $Ez^2=(Eu_3^2+Ev_3^2+Ew_3^2)$, a square root $E_0$ of $(Ex_0^2+Ey_0^2+Ez_0^2)$ corresponding to $Ex^2$, $Ey^2$, and $Ez^2$ of the sums of the squares of the voltages $Eu_1$ to $Eu_3$, $Ev_1$ to $Ev_3$, and $Ew_1$ to $Ew_3$ is calculating, when the set of said first to third exciting coils is arranged at the first position and the set of said first to third detecting coils is arranged at the second position, by using an equation of $E_0=(Ex_0^2+Ey_0^2+Ez_0^2)^{1/2}$, when the set of said first to third detecting coils are moved at third position, a distance $r_1$ from the set of said first to third exciting coils to the set of said first to third exciting coils is set and a square root $E_1$ of $(Ex_1^2+Ey_1^2+Ez_1^2)$ corresponding to $Ex^2$, $Ey^2$, and $EZ^2$ as the sums of the squares of the voltages $Eu_1$ to $Eu_3$, $Ev_1$ to $Ev_3$, and $Ew_1$ to $Ew_3$ is calculated by using an equation of $$E_1=(Ex_1^2+Ey_1^2+Ez_1^2)^{1/2};\ \text{and}$$

the distance $r_1$ is calculating, irrespective of directions of said first to third exciting coils and directions of said first to third exciting coils, by using an equation of $$r_1=\{(E_0/E_1)^{1/3}\}r_0.$$

15. An apparatus according to claim 14, wherein said signal generating circuit comprises an oscillating circuit and an amplifier for amplifying an output of said oscillating circuit, and said voltage extracting circuit comprises a detection circuit for detecting outputs, of said first to third detecting coils, which are extracted via said second switching circuit.

16. An apparatus according to claim 15, wherein said detection circuit uses a phase sensitive detection circuit for synchronously detecting an output of said amplifier as a detected signal.

17. A position measuring apparatus comprising:
first to third oscillating circuits for generating AC signals of first to third frequencies;
first to third amplifiers for amplifying outputs of said first to third oscillating circuits, respectively;
a set of first to third exciting coils, connected to output sides of said first to third amplifiers, which is arranged at three perpendicular axes of a triaxial coordinate system and arranged at a first position;
a set of first to third detecting coils which is arranged at three perpendicular axes of a triaxial coordinate system and arranged at a second position distant from the first position by a predetermined distance $r_0$;
an output switching circuit for extracting outputs of said first to third detecting coils; and
first to third detection circuits for detecting the first to third frequencies, in response to the outputs of said first to third detecting coils, which are extracted via said output switching circuit,
wherein voltages $Eu_1$, $Ev_1$, and $Ew_1$, corresponding to the first to third frequencies, which are induced in said first detecting coil, are sequentially measured when said first to third exciting coils are excited,
voltages $Eu_2$, $Ev_2$, and $Ew_2$, corresponding to said first to third frequencies, which are induced in said second detecting coil, are sequentially measured when said first to third exciting coils are excited,
voltages $Eu_3$, $Ev_3$, and $Ew_3$, corresponding to the first to third frequencies, which are induced in said third detecting coil are sequentially measured when said first to third exciting coils are excited,
$Ex^2$, $Ey^2$, and $EZ^2$ as sums of squares of the voltages $Eu_1$ to $Eu_3$, $Ev_1$ to $Ev_3$, and $Ew_1$ to $Ew_3$ are calculated by equations of $$Ex^2=(Eu_1^2+Ev_1^2+Ew_1^2),$$
$$Ey^2=(Eu_2^2+Ev_2^2+Ew_2^2),\ \text{and}$$
$$Ez^2=(Eu_3^2+Ev_3^2+Ew_3^2),$$

a square root $E_0$ of $(EX_0^2+Ey_0^2+Ez_0^2)$ corresponding to the sums $Ex^2$, $Ey^2$, and $EZ^2$ as the sums of the squares of the voltages $Eu_1$ to $Eu_3$, $Ev_1$ to $Ev_3$, and $Ew_1$ to $Ew_3$ is calculated, when the set of the first to third exciting coils is arranged at the first position and the set of said first to third detecting coils is arranged at the second position, by using an equation of $$E_0=(Ex_0^2+Ey_0^2+Ez_0^2)^{1/2},$$

when the set of said first to third detecting coils are moved at a third position, a distance $r_1$ from the set of said first to third exciting coils to the set of said first to third exciting coils is set and a square root $E_1$ of $(Ex_1^2+Ey_1^2+Ez_1^2)$ corresponding to $Ex^2$, $Ey^2$, and $Ez^2$ as the sums of the squares of the voltages $Eu_1$ to $Eu_3$, $Ev_1$ to $Ev_3$, and $Ew_1$ to $Ew_3$ is calculated by using an equation of $$E_1=(Ex_1^2+Ey_1^2+Ez_1^2)^{1/2},\ \text{and}$$

the distance $r_1$ is calculating, irrespective of directions of said first to third exciting coils and directions of said first to third exciting coils, by using an equation of $$r_1=\{(E_0/E_1)^{1/3}\}\cdot r_0.$$

18. A position measuring apparatus comprising:
a signal generating circuit for outputting an AC signal;
a set of first to third exciting coils arranged at three perpendicular axes of a triaxial coordinate system and at a first position which is predetermined;
a set of fourth to sixth exciting coils arranged at three perpendicular axes of a triaxial coordinate system and at a second position which is predetermined;
a set of seventh to ninth exciting coils arranged at three perpendicular axes of a triaxial coordinate system and at a third position which is predetermined;
a first switching circuit for sequentially exciting said first to ninth exciting coils in response to the output of said signal generating circuit;
a set of first to third detecting coils arranged at three perpendicular axes of a triaxial coordinate system at a fourth position distant from said first to third positions;
a second switching circuit for sequentially extracting outputs of said first to third exciting coils; and
a voltage extracting circuit for obtaining a voltage signal from said output extracted by said second switching circuit,
wherein all twenty-seven voltages which are induced in said first to third detecting coils are sequentially measured, when said first to ninth exciting coils are sequentially excited in the case in which the set of said first to third detecting coils is arranged at said fourth position,
all twenty-seven voltages which are induced in said first to third detecting coils are sequentially measured, when said first to ninth exciting coils are sequentially excited in the case in which the set of said first to third detecting coils is arranged at a fifth position distant from the fourth position, and
a coordinate position of the fifth position are determined based on a predetermined calculation by using all fifty-four voltages which are measured.

19. A position measuring apparatus comprising:
a signal generating circuit for outputting an AC signal;
a set of first to third exciting coils arranged at three perpendicular axes of a triaxial coordinate system and at a first position which is predetermined;

a first switching circuit for sequentially exciting said first to third exciting coils in response to an output of said signal generating circuit;

a set of first to third detecting coils arranged at three perpendicular axes of a triaxial coordinate system at a second position distant from the first position;

a set of fourth to sixth detecting coils arranged at three perpendicular axes of a triaxial coordinate system and at a third position distant from the first position;

a set of seventh to ninth exciting coils arranged at three perpendicular axes of a triaxial coordinate system and at a fourth position distant from the first position;

a second switching circuit for sequentially extracting outputs of said first to ninth detecting coils; and a voltage extracting circuit for obtaining a voltage signal from an output extracted by said second switching circuit, wherein all twenty-seven voltages which are induced in said first to ninth detecting coils are sequentially measured, when said first to third exciting coils are sequentially excited in the case in which the set of said first to third detecting coils is arranged at the second position, the set of said fourth to sixth detecting coils is arranged at the third position, and the set of said seventh to ninth detecting coils is arranged at said the position, all twenty-seven voltages which are induced in said first to ninth detecting coils are sequentially measured, when said first to third exciting coils are sequentially excited in the case in which at least one of the set of said first to third detecting coils, the set of said fourth to sixth detecting coils, and the set of said seventh to ninth detecting coils is moved at a fifth position, and a coordinate position of the fifth position are determined based on a predetermined calculation by using all fifty-four voltages which are measured.

* * * * *